(12) United States Patent
Gundel et al.

(10) Patent No.: US 12,113,339 B2
(45) Date of Patent: Oct. 8, 2024

(54) ELECTRICAL POWER CABLE PREPARATION DEVICE

(71) Applicants: 3M Innovative Properties Company, St. Paul, MN (US); Connected Intelligence Systems, Ltd., Netanya (IL)

(72) Inventors: Douglas B. Gundel, Cedar Park, TX (US); Assaf Kaufman, Tal Shahar (IL); Uri Bar-Ziv, Zichron Yaakov (IL)

(73) Assignees: 3M Innovative Properties Company, St. Paul, MN (US); Connected Intelligence Systems Ltd., Netanya (IL)

( * ) Notice: Subject to any disclaimer, the term of this patent is extended or adjusted under 35 U.S.C. 154(b) by 95 days.

(21) Appl. No.: 17/309,690

(22) PCT Filed: Dec. 20, 2019

(86) PCT No.: PCT/US2019/067956
§ 371 (c)(1),
(2) Date: Jun. 15, 2021

(87) PCT Pub. No.: WO2020/132506
PCT Pub. Date: Jun. 25, 2020

(65) Prior Publication Data
US 2022/0029395 A1   Jan. 27, 2022

Related U.S. Application Data

(60) Provisional application No. 62/846,351, filed on May 10, 2019, provisional application No. 62/784,214, filed on Dec. 21, 2018.

(51) Int. Cl.
*H02G 1/12*   (2006.01)
*H04N 7/18*   (2006.01)
*H04N 23/51*  (2023.01)

(52) U.S. Cl.
CPC ......... *H02G 1/1265* (2013.01); *H02G 1/1248* (2013.01); *H02G 1/127* (2013.01); *H04N 7/188* (2013.01); *H04N 23/51* (2023.01)

(58) Field of Classification Search
CPC ............ Y10Y 83/0333; Y10Y 83/0348; H02G 1/1265; H02G 1/1248; H02G 1/127
(Continued)

(56) References Cited

U.S. PATENT DOCUMENTS 2,474,275 A * 6/1949 Ostlund .................. H03K 3/55
                                                    327/183
3,128,658 A    4/1964 Mitchell et al.
(Continued)

FOREIGN PATENT DOCUMENTS

CH      641278 A5    2/1984
CN     1161763 A    10/1997
(Continued)

OTHER PUBLICATIONS

U.S. Appl. No. 17/309,774, filed Jun. 17, 2021, naming inventors Gundel et al.
(Continued)

*Primary Examiner* — Phong H Nguyen
(74) *Attorney, Agent, or Firm* — Shumaker & Sieffert, P.A.

(57) ABSTRACT

Techniques, systems and articles are described for preparing electrical cables for connections to a power grid. In one example, a system includes a cable preparation device configured to cut one or more layers of an electrical cable and a computing device configured to control the cable preparation device to cut the one or more layers of the electrical cable.

22 Claims, 21 Drawing Sheets

(58) Field of Classification Search
USPC .................. 81/9.4, 9.51, 9.41; 30/92–96
See application file for complete search history.

(56) References Cited

U.S. PATENT DOCUMENTS

| | | | |
|---|---|---|---|
| 3,601,891 A | 8/1971 | Destito | |
| 4,301,399 A | 11/1981 | Miller et al. | |
| 4,321,643 A | 3/1982 | Vernier | |
| 4,345,362 A | 8/1982 | de Givry | |
| 4,424,480 A | 1/1984 | Stefan | |
| 4,546,675 A | 10/1985 | Okada et al. | |
| 4,745,828 A | 5/1988 | Stepan | |
| 4,769,910 A * | 9/1988 | Noon | H02G 1/1226 30/91.2 |
| 4,802,512 A | 2/1989 | Kodera | |
| 5,038,457 A | 8/1991 | Yasushi et al. | |
| 5,243,882 A | 9/1993 | Stepan | |
| 5,272,941 A | 12/1993 | English et al. | |
| 5,323,117 A | 6/1994 | Endoh et al. | |
| 5,502,374 A | 3/1996 | Cota | |
| 5,515,609 A * | 5/1996 | Sperti | B23D 21/10 30/95 |
| 5,617,859 A | 4/1997 | Souza et al. | |
| 5,691,763 A | 11/1997 | Ichikawa et al. | |
| 5,756,972 A | 5/1998 | Vranicar et al. | |
| 5,892,430 A | 4/1999 | Wiesman et al. | |
| 5,936,725 A | 8/1999 | Pike et al. | |
| 6,286,393 B1 | 9/2001 | Messer et al. | |
| 6,617,859 B1 | 9/2003 | Orton | |
| 6,734,662 B1 | 5/2004 | Fenske | |
| 6,739,055 B2 * | 5/2004 | Lee | B23D 21/08 30/101 |
| 7,166,804 B2 | 1/2007 | Yumura et al. | |
| 8,600,700 B2 | 12/2013 | Vogel et al. | |
| 8,643,380 B1 | 2/2014 | Herbert | |
| 9,917,434 B2 | 3/2018 | George et al. | |
| 9,961,418 B2 | 5/2018 | Rodriguez et al. | |
| 10,192,678 B2 | 1/2019 | Koo et al. | |
| 10,338,103 B2 | 7/2019 | Gravermann et al. | |
| 10,811,856 B2 | 10/2020 | Symington et al. | |
| 11,381,061 B2 | 7/2022 | Symington et al. | |
| 2005/0050713 A1 | 3/2005 | Locher et al. | |
| 2005/0099636 A1 | 5/2005 | Schweser | |
| 2010/0114392 A1 | 5/2010 | Lancaster | |
| 2010/0308797 A1 | 12/2010 | Zimmermann | |
| 2012/0047724 A1 | 3/2012 | Yano et al. | |
| 2012/0192414 A1 | 8/2012 | Montena et al. | |
| 2012/0199392 A1 | 8/2012 | Samuelson et al. | |
| 2012/0203493 A1 | 8/2012 | Dobson et al. | |
| 2012/0268106 A1 | 10/2012 | Blake, Jr. et al. | |
| 2012/0306510 A1 | 12/2012 | White et al. | |
| 2013/0054162 A1 | 2/2013 | Smith et al. | |
| 2014/0368215 A1 | 12/2014 | Hoffman et al. | |
| 2015/0062328 A1 | 3/2015 | Lauffer et al. | |
| 2015/0089815 A1 | 4/2015 | Woodward | |
| 2015/0120218 A1 | 4/2015 | Garnacho Vecino et al. | |
| 2015/0128399 A1 | 5/2015 | Meierhans et al. | |
| 2015/0287180 A1 | 10/2015 | Frey | |
| 2016/0054363 A1 | 2/2016 | Rostron et al. | |
| 2016/0091533 A1 | 3/2016 | Soleillant et al. | |
| 2016/0139181 A1 | 5/2016 | Gravermann et al. | |
| 2016/0225248 A1 | 8/2016 | Rodriguez, Jr. et al. | |
| 2017/0222420 A1 | 8/2017 | Dhlamini | |
| 2017/0310092 A1 | 10/2017 | Viviroli | |
| 2017/0346265 A1 | 11/2017 | Soerensen | |
| 2018/0017611 A1 | 1/2018 | Radun et al. | |
| 2018/0059162 A1 | 3/2018 | Leblanc et al. | |
| 2018/0062370 A1 | 3/2018 | Heidmann et al. | |
| 2018/0238955 A1 | 8/2018 | Bango et al. | |
| 2018/0252760 A1 | 9/2018 | Andle et al. | |
| 2018/0328531 A1 | 11/2018 | Weisenberg et al. | |
| 2019/0128927 A1 | 5/2019 | Shaw et al. | |
| 2019/0293706 A1 | 9/2019 | Sohn et al. | |
| 2019/0369152 A1 | 12/2019 | Fallet et al. | |
| 2019/0393685 A1 | 12/2019 | Sedlacek | |
| 2020/0076173 A1 * | 3/2020 | Houser | H01R 43/28 |
| 2021/0273426 A1 * | 9/2021 | Khu | H02G 1/1265 |
| 2022/0045491 A1 | 2/2022 | Gundel et al. | |
| 2022/0060002 A1 | 2/2022 | Gundel et al. | |

FOREIGN PATENT DOCUMENTS

| | | |
|---|---|---|
| CN | 1530965 A | 9/2004 |
| CN | 1601659 A | 3/2005 |
| CN | 101666849 A | 3/2010 |
| CN | 102116824 A | 7/2011 |
| CN | 102313861 A | 1/2012 |
| CN | 102623871 A | 8/2012 |
| CN | 202373838 U | 8/2012 |
| CN | 202978201 U | 6/2013 |
| CN | 103339813 A | 10/2013 |
| CN | 103560441 A | 2/2014 |
| CN | 104407270 A | 3/2015 |
| CN | 104518393 A | 4/2015 |
| CN | 204256093 U | 4/2015 |
| CN | 104821521 A | 8/2015 |
| CN | 104849628 A | 8/2015 |
| CN | 104979740 A | 10/2015 |
| CN | 105043457 A | 11/2015 |
| CN | 204988364 U | 1/2016 |
| CN | 205175574 U | 4/2016 |
| CN | 205263241 U | 5/2016 |
| CN | 105629136 A | 6/2016 |
| CN | 105699860 A | 6/2016 |
| CN | 205509462 U | 8/2016 |
| CN | 106025940 A | 10/2016 |
| CN | 106124948 A | 11/2016 |
| CN | 205719288 U | 11/2016 |
| CN | 106353648 A | 1/2017 |
| CN | 106451253 A | 2/2017 |
| CN | 206038828 U | 3/2017 |
| CN | 206135313 U | 4/2017 |
| CN | 106646156 A | 5/2017 |
| CN | 106771933 A | 5/2017 |
| CN | 206147041 U | 5/2017 |
| CN | 106855443 A | 6/2017 |
| CN | 106950477 A | 7/2017 |
| CN | 106980075 A | 7/2017 |
| CN | 107306021 A | 10/2017 |
| CN | 206685810 U | 11/2017 |
| CN | 107453188 A | 12/2017 |
| CN | 108169644 A | 6/2018 |
| CN | 108376884 A | 8/2018 |
| CN | 207765893 U | 8/2018 |
| CN | 108941386 A | 12/2018 |
| DE | 2928727 A1 | 2/1981 |
| DE | 3025819 A1 | 2/1982 |
| DE | 3702735 A1 | 8/1988 |
| DE | 20117063 U1 | 1/2002 |
| DE | 202008017358 U1 | 8/2009 |
| DE | 102011079935 A1 | 1/2013 |
| EP | 1902498 A1 | 3/2008 |
| EP | 2472688 A2 | 7/2012 |
| EP | 2579055 A1 | 4/2013 |
| EP | 2806277 A1 | 11/2014 |
| EP | 2818881 A1 | 12/2014 |
| EP | 3002594 A1 | 4/2016 |
| EP | 3109958 A1 | 12/2016 |
| EP | 3182428 A1 | 6/2017 |
| FR | 2282179 A1 | 3/1976 |
| FR | 2920922 A1 | 3/2009 |
| GB | 2288696 A | 10/1995 |
| GB | 2463689 A | 3/2010 |
| GB | 2542939 A | 4/2017 |
| JP | S60256068 A | 12/1985 |
| JP | H03273809 A | 12/1991 |
| JP | H06160459 A | 6/1994 |
| JP | H06308191 A | 11/1994 |
| JP | H09182237 A | 7/1997 |
| JP | H10201070 A | 7/1998 |
| JP | H11258169 A | 9/1999 |
| JP | 2004156910 A | 6/2004 |
| JP | 2012026890 A | 2/2012 |
| JP | 2015104274 A | 6/2015 |

(56) References Cited

FOREIGN PATENT DOCUMENTS

| | | |
|---|---|---|
| KR | 101317476 B1 | 10/2013 |
| KR | 101847456 B1 | 4/2018 |
| WO | 9840756 | 9/1998 |
| WO | 0042444 | 7/2000 |
| WO | 2006100590 A1 | 9/2006 |
| WO | 2007052095 A1 | 5/2007 |
| WO | 2008072226 A2 | 6/2008 |
| WO | 2012130816 A1 | 10/2012 |
| WO | 2014129817 A1 | 8/2014 |
| WO | 2015179102 A1 | 11/2015 |
| WO | 2016019666 A1 | 2/2016 |
| WO | 2016058721 A1 | 4/2016 |
| WO | 2016088174 A1 | 6/2016 |
| WO | 2016088175 A1 | 6/2016 |
| WO | 2016137424 A1 | 9/2016 |
| WO | 2016177571 A2 | 10/2016 |
| WO | 2016187090 A1 | 11/2016 |
| WO | 2018087337 A1 | 5/2018 |

OTHER PUBLICATIONS

U.S. Appl. No. 17/309,755, filed Jun. 17, 2021, naming inventors Gundel et al.

U.S. Appl. No. 17/309,773, filed Jun. 17, 2021, naming inventors Gundel et al.

Notice of Intent to Grant from counterpart Chinese Application No. 201980089864.6 dated Oct. 19, 2022, 5 pp.

Van Der Wielen, "Synchronization of online PD detection and localization setups using pulse injection", Proceedings of the 7th International Conference on Properties and Applications of Dielectric Materials, vol. 01, IEEE, Jun. 2003, pp. 327-330.

Wang et al., "Calibration of capacitive couplers for online PD detection in HV cables", IEEE Electrical Insulation Magazine, vol. 11, No. 03, IEEE, May 2005, pp. 28-39.

U.S. Appl. No. 17/757,916, filed Nov. 30, 2020, naming inventors Gundel et al.

International Search Report and the Written Opinion from International application No. PCT/US2019/067956 dated Apr. 17, 2020, 17 pgs.

First Office Action and Search Report, and translation thereof, from counterpart Chinese Application No. 201980089864.6 dated May 9, 2022, 23 pp.

International Preliminary Report on Patentability from International Application No. PCT/US2019/067956, dated Jul. 1, 2021, 11 pp.

Response to Office Action dated May 9, 2022, from counterpart Chinese Application No. 201980089864.6 filed Aug. 18, 2022, 63 pp.

Communication pursuant to Article 94(3) EPC from counterpart European Application No. 19839752.3 dated Sep. 19, 2023, 9 pp.

Response to Communication pursuant to Article 94(3) EPC dated Sep. 19, 2023, from counterpart European Application No. 19839752.3 filed Jan. 18, 2024, 15 pp.

* cited by examiner

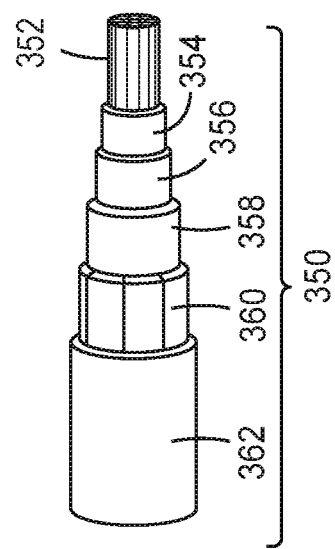
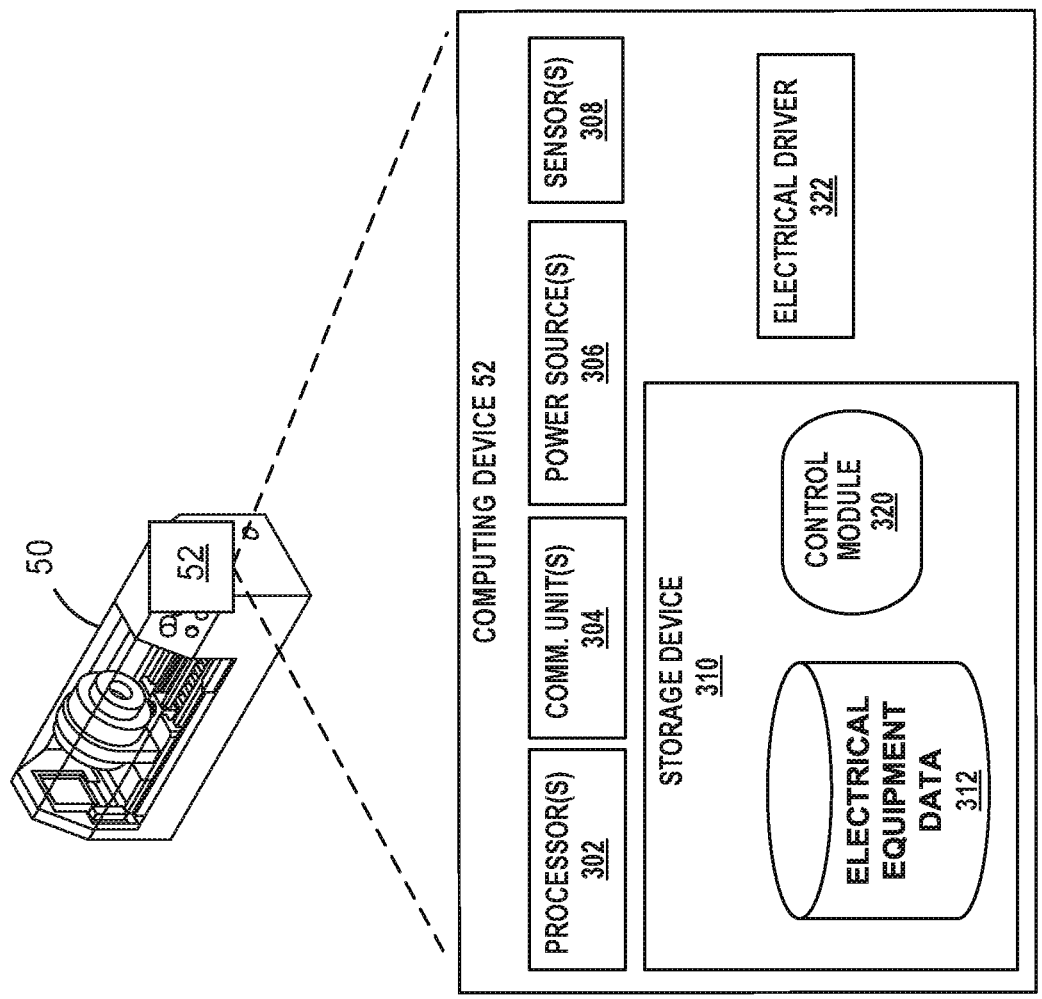
FIG. 2A
FIG. 2B

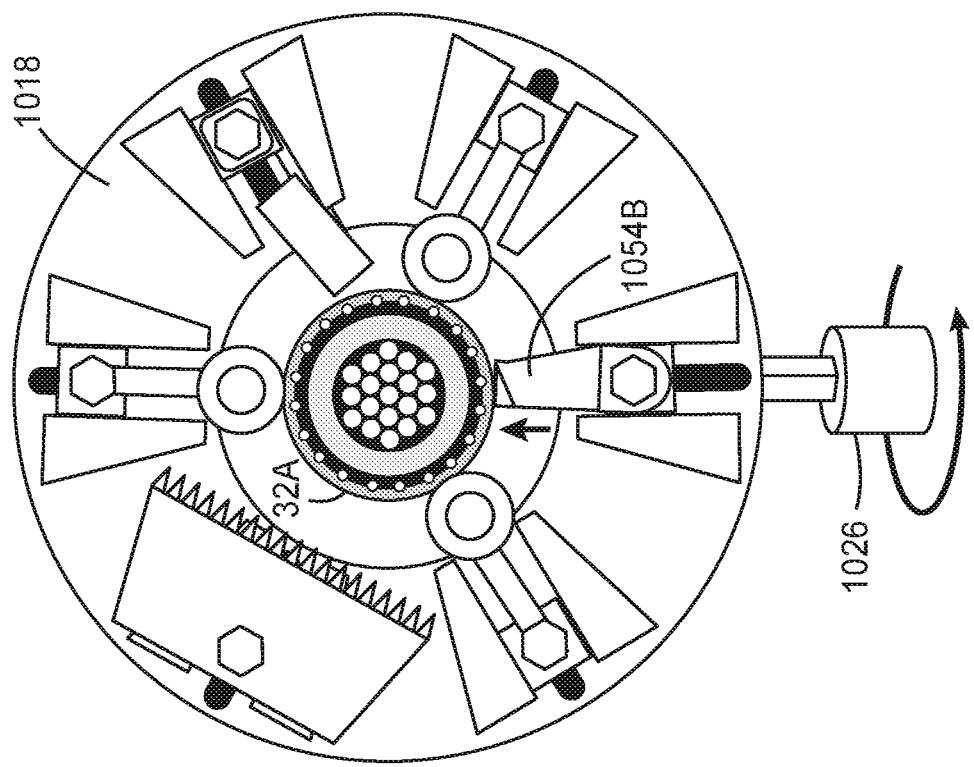
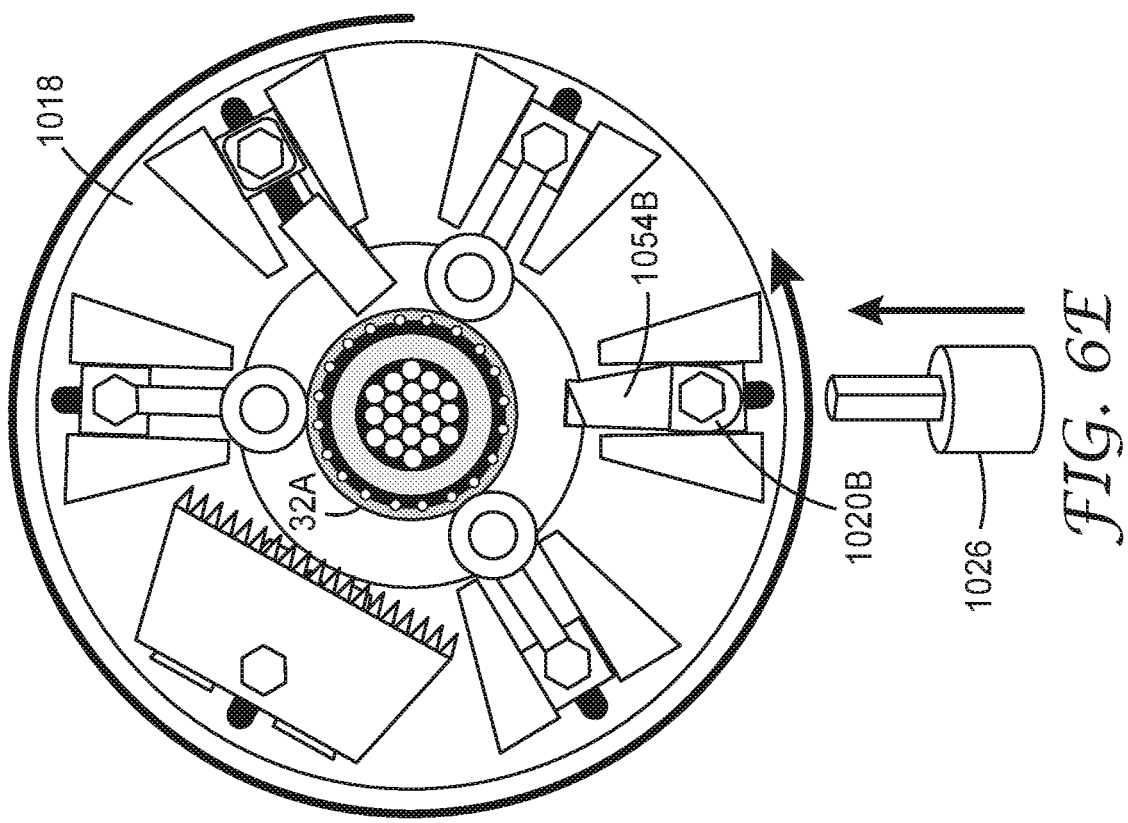

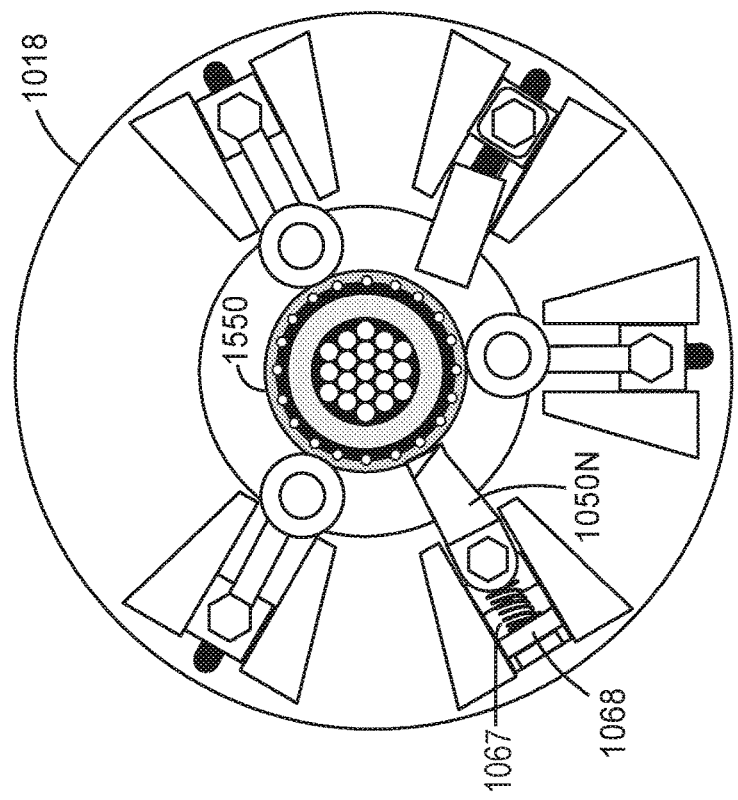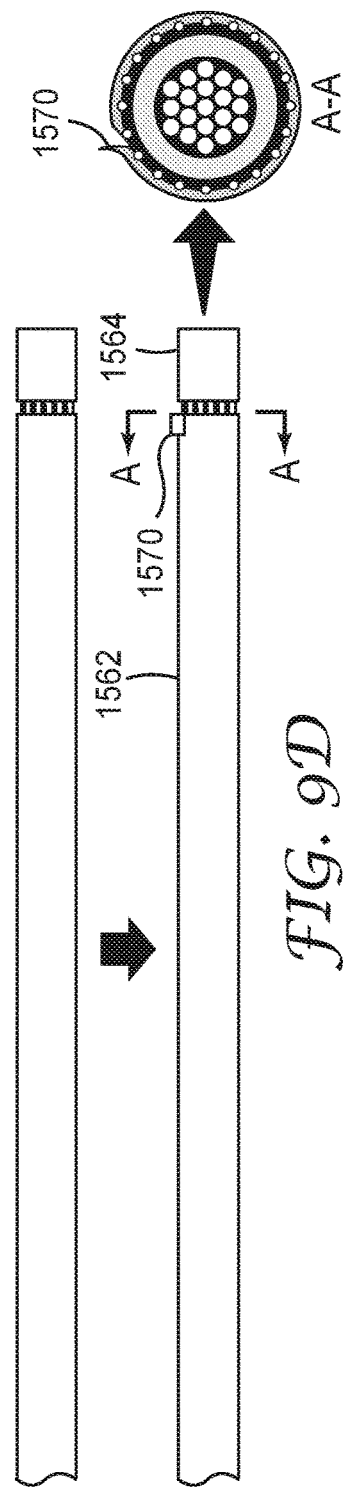
FIG. 9C
FIG. 9D

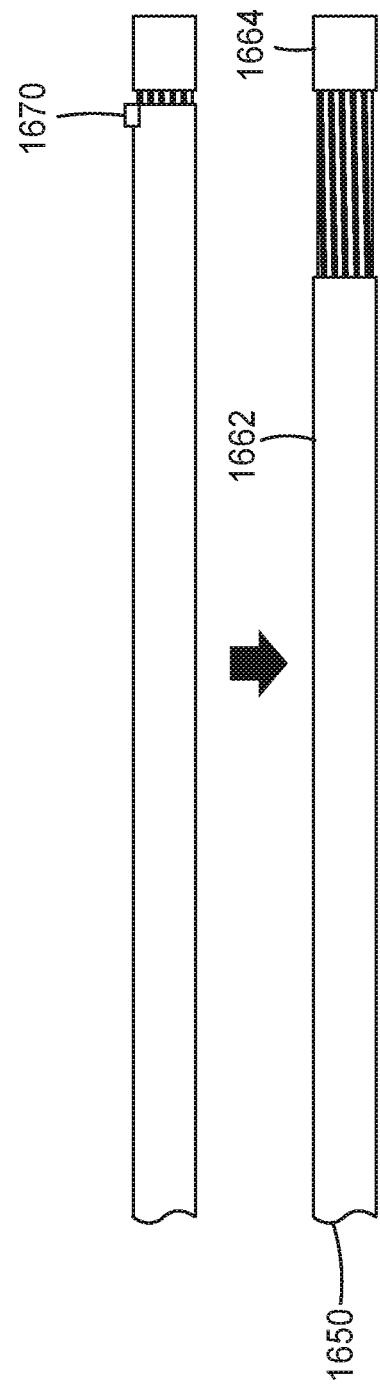

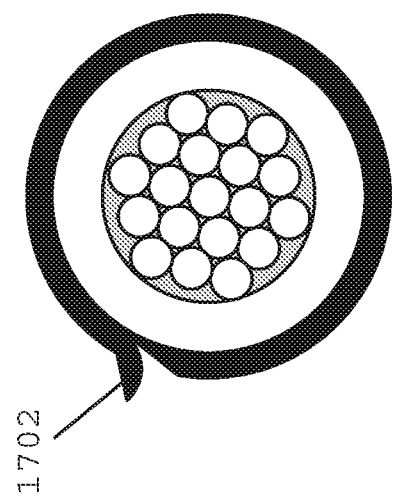
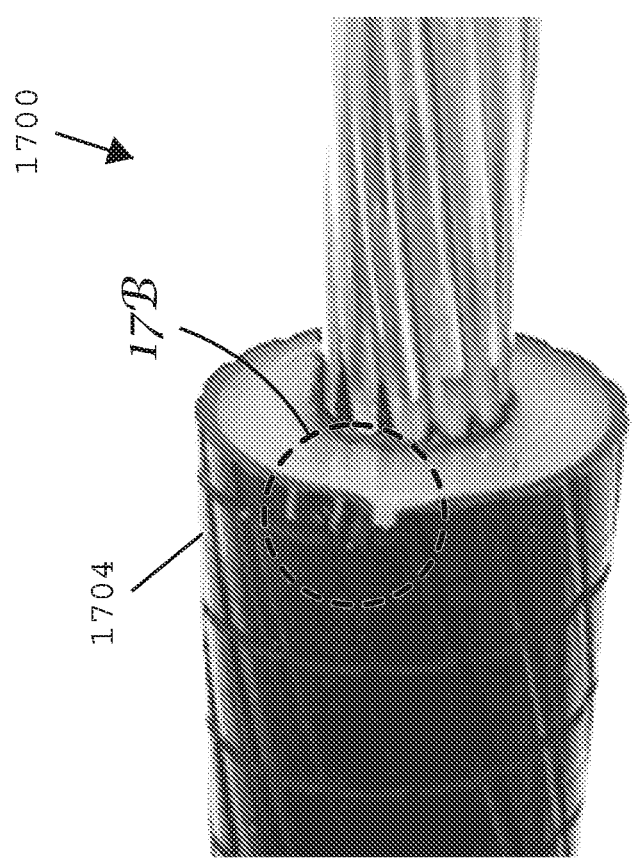

ELECTRICAL POWER CABLE PREPARATION DEVICE

This application claims the benefit of U.S. Provisional Patent Application Ser. No. 62/784,214, entitled "ELECTRICAL POWER CABLE PREPARATION SYSTEM," and filed on Dec. 21, 2018, and U.S. Provisional Patent Application No. 62/846,351 entitled "ELECTRICAL POWER CABLE PREPARATION DEVICE", and filed on May 10, 2019, the entire content of which are incorporated herein by reference.

TECHNICAL FIELD

The present disclosure relates to the field of electrical equipment, including power cables and accessories, for power utilities.

BACKGROUND

Electrical power grids include numerous components that operate in diverse locations and conditions, such as above ground, underground, cold weather climates, hot weather climates, etc. A power grid may include hundreds or thousands of discrete components, such as transformers, electrical cables, cable accessories (e.g., cable splices, terminations), etc., and a failure in the power grid may be caused by a failure in any single component or a collection of the components. Installation of electrical cables is a manual process prone to errors, which may cause failure in the electrical cable or a cable accessory.

SUMMARY

The present disclosure provides techniques for preparing electrical cables to connect to cable accessories for use in a power grid. According to examples of this disclosure, an electrical cable preparation device is configured to automatically remove one or more layers of the electrical cable for coupling the electrical cable to a cable accessory (e.g., a cable splice body or a termination). In one example, the cable preparation device includes a tool head with one or more cutting tools that are configured to cut various layers of the electrical cable and a plurality of rollers that are configured to maintain an electrical cable in a proper position while the cutting tools cut the layers of the electrical cable. The cable preparation device is configured to automatically adjust a radial depth of the plurality of rollers and/or a radial depth of the cutting tools. In one example, the cable preparation device creates a retention band by cutting through a jacket layer of the electrical cable. The retention band may prevent interior layers of the electrical cable from fraying, becoming loose, or otherwise interfering with subsequent cuts. In another example, the cable preparation device creates a tab in the jacket layer (e.g., after creating the retention band). Creating the tab in the jacket layer may enable the cable preparation device to lift the jacket from the interior layer while cutting the interior portion of the jacket layer, which may simplify the removal of the jacket layer and potentially reduce or eliminate damage to interior layers of the electrical cable (e.g., a shield layer).

In this way, the cable preparation device may prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, and hence the decrease the probability and/or quantity of partial discharge events. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

In one example, an electrical cable preparation device is configured to remove one or more layers of an electrical cable. The device includes a rotatable tool head and a tool positioning driver. The rotatable tool head includes a plurality of rollers and at least one cutting tool. The tool positioning driver is configured to insert into the rotatable tool head to adjust a radial depth of the plurality of rollers or a radial depth of the at least one cutting tool.

In another example, an electrical cable preparation device is configured to remove one or more layers of an electrical cable. The device includes a rotatable tool head comprising a plurality of rollers and at least one cutting tool. The cable preparation device is configured to remove the one or more layers of the electrical cable by at least being configured to: insert the at least one cutting tool into the electrical cable to a first depth; rotate the tool head a partial rotation with the at least one cutting tool at the first depth to create a tab in the one or more layers at an end of the one or more layers; retract the at least one cutting tool to a second depth; and perform a spiral cut with the at least one cutting tool at the second depth by rotating the tool head around the electrical cable as the tool head moves from the tab longitudinally relative to a center axis of the electrical cable.

In yet another example, electrical cable preparation device is configured to remove one or more layers of an electrical cable. The device includes a rotatable tool head comprising a plurality of rollers and at least one cutting tool. The cable preparation device is configured to remove the one or more layers of the electrical cable by at least being configured to: create a retention band of a jacket layer of the one or more layers of the electrical cable by at least being configured to: position the tool head at a longitudinal starting position a distance from an end of the electrical cable, insert the at least one cutting tool toward a center of the electrical cable to a target cutting depth, and rotate the tool head around the electrical cable with the at least one cutting tool at the target cutting depth; and responsive to creating the retention band, remove an inner portion of the jacket layer between the longitudinal starting position and a longitudinal position defined by a target cutback length associated with the jacket layer.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIGS. 2A and 2B are conceptual diagrams of a cable preparation device configured to prepare an electrical cable for installation to an electrical grid, in accordance with various techniques of this disclosure.

FIGS. 6A-6F are conceptual diagrams illustrating an example technique for operating an example tool head, in accordance with various techniques of this disclosure.

FIGS. 9A-9D are conceptual diagrams illustrating an example technique for preparing an example electrical cable using an example cable preparation device, in accordance with various techniques of this disclosure.

FIGS. 10A-10C are conceptual diagrams illustrating details of an example technique of preparing an example electrical cable using an example cable preparation device, in accordance with various techniques of this disclosure.

FIGS. 17A and 17B are conceptual diagrams illustrating an example defect in an electrical cable.

It is to be understood that the embodiments may be utilized and structural changes may be made without departing from the scope of the invention. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1B:
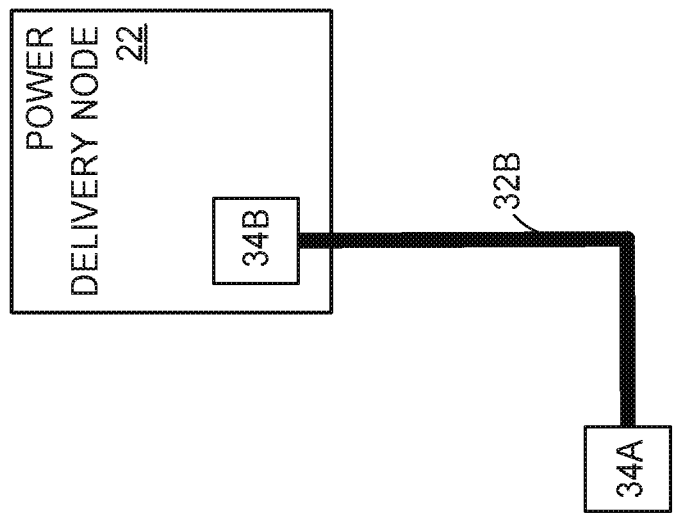
FIGS. 1A and 1B are conceptual diagrams illustrating an example system for preparing electrical cables for use within an electrical power grid, in accordance with various techniques of this disclosure.
Figure 1A:
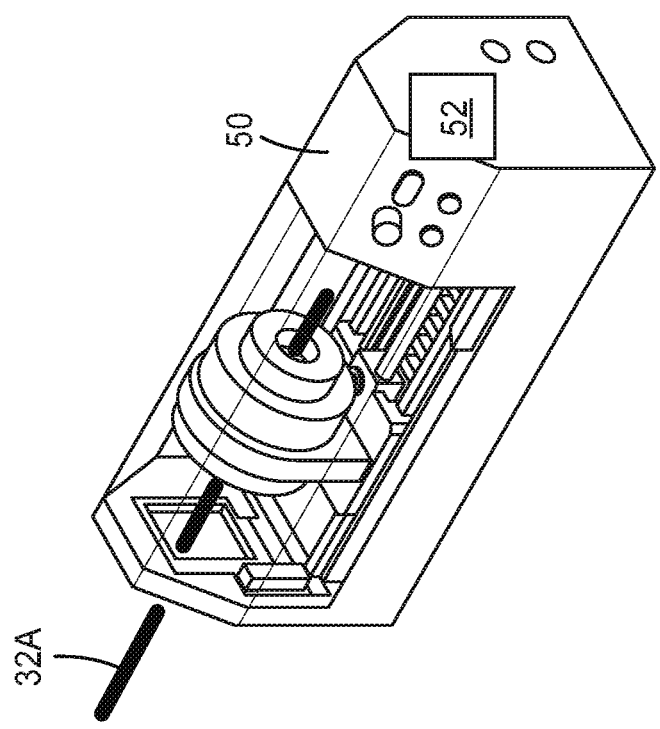

FIGS. 1A and 1B are conceptual diagrams illustrating an example system 2 for automatically preparing electrical cables for use within an electrical power grid. System 2 represents a physical environment in which one or more electrical power lines 24 provide power from a power source (e.g., power plant) to one or more consumers (e.g., businesses, homes, government facilities, etc.). System 2 includes a plurality of articles of electrical equipment, such as one or more power delivery nodes 22, one or more power lines 24, and one or more cable preparation devices 50.

Power delivery nodes 22 may include one or more input lines to receive power (e.g., directly from a power source or indirectly via another power delivery node 22) and one or more output lines to directly or indirectly (e.g., via another power delivery node 22) distribute power to consumers (e.g., homes, businesses, etc.). Power delivery nodes 22 may include a transformer to step voltages up or down. In some examples, power delivery node 22 may be a relatively small node to distribute power to homes in a neighborhood, such as an electrical cabinet, pole-mount transformer, or pad-mount transformer. As another example, power delivery node 22 may be a relatively large node (e.g., a transmission substation) that distributes power to other power delivery nodes (e.g., distribution substations), such that the other power delivery nodes further distribute power to consumers (e.g., homes, businesses, etc.).

Power lines 24 may transmit electrical power from a power source (e.g., a power plant) to a power consumer, such as a business or home. Power lines 24 may be underground, underwater, or suspended overhead (e.g., from wooden poles, metal structures, etc.). Power lines 24 may be used for electrical power transmission at relatively high voltages (e.g., compared to electrical cables utilized within a home, which may transmit electrical power between approximately 12 volts and approximately 240 volts depending on application and geographic region). For example, power lines 24 may transmit electrical power above approximately 600 volts (e.g., between approximately 600 volts and approximately 1,000 volts). However, it should be understood that power lines 24 may transmit electrical power over any voltage and/or frequency range. For example, lines 24 may transmit electrical power within different voltage ranges. In some examples, a first type of lines 24 may transmit voltages of more than approximately 1,000 volts, such as for distributing power between a residential or small commercial customer and a power source (e.g., power utility). As another example, a second type of lines 24 may transmit voltages between approximately 1 kV and approximately 69 kV, such as for distributing power to urban and rural communities. A third type of lines 24 may transmit voltages greater than approximately 69 kV, such as for sub-transmission and transmission of bulk quantities of electric power and connection to very large consumers.

Power lines 24 include electrical cables 32-32B (collectively, electrical cables 32) and one or more electrical cable accessories 34A-34B (collectively, cable accessories 34). Electrical cables 32 may also be referred to as electrical power cables, power cables, or cables. Each electrical cable 32 includes a conductor which may be radially surrounded by one or more layers of insulation. In some examples, electrical cables 32 include a plurality of stranded conductors (e.g., a three-phase or multi-conductor cable). Example cable accessories 34 may include splices, separable connectors, terminations, and connectors, among others. In some examples, cable accessories 34 may include cable splices configured to couple (e.g., electrically and physically) two or more electrical cables 32. For example, cable accessory 34A is configured to electrically and physically couple cable 32A to cable 32B. In some examples, terminations may be configured to couple (e.g., electrically and physically) a cable 32 to additional electrical equipment, such as a transformer, switch gear, power substation, business, home, or other structure. For example, cable accessory 34B electrically and physically couples cable 32B to power delivery node 22 (e.g., to a transformer of the power delivery node 22).

Cable preparation device 50 is configured to automatically cut one or more layers of electrical cable 32A to prepare electrical cable 32A for coupling to a cable accessory (e.g., cable accessory 34A). Cable preparation device 50 may be configured to automatically remove various layers (e.g., a cable jacket layer, a shield layer, an insulation layer, an insulation screen layer, a conductor screen layer, or other layers) of electrical cable 32A as the layers are cut. For example, as illustrated and described in later FIGS., cable preparation device 50 may include one or more cutting tools (e.g., knife blades, saws, etc.) that are configured to cut the various layers of electrical cable 32A.

According to techniques of this disclosure, system 2 includes a cable preparation device 50 configured to remove one or more layers of an electrical cable 32A. Cable preparation device 50 may more efficiently and accurately prepare electrical cables 32A for installation within a power line of a power grid, compared to existing techniques. In some examples, cable preparation device 50 includes a rotatable tool head. In some examples, the tool head includes one or more cutting tools which may be configured to perform different types of cuts (e.g., scoring cuts, shaving cuts, through cuts) in different directions (e.g., longitudinally, radially, circumferentially) to cut, and optionally remove, various layers of electrical cable 32A. In one example, the tool head includes a plurality of rollers configured to support electrical cable 32A while one or more cutting tools of the tool head cut the various layers.

Cable preparation device 50 includes a computing device 52 configured to control operation of the cable preparation device 50. In some examples, computing device 52 controls cable preparation device 50 to adjust various components of cable preparation device 50 to cut the various layers of electrical cable 32A. In one example, computing device 52 outputs a command causing cable preparation device 50 to adjust a depth of the plurality of rollers, which may enable the tool head to support electrical cable 32A as the cutting tools cut the various layers of electrical cable 32A.

In some examples, computing device 52 outputs various commands to control the starting position of the cutting tools and a cutting distance (e.g., a cutting depth or cutback length) of the cutting tools. In one example, computing device 52 causes the tool head to start cutting at one end of electrical cable 32A. In another example, computing device 52 causes the tool head to start cutting a pre-determined distance from the end of the electrical cable 32A to create a retention band of one or more layers of electrical cable 32A. The retention band may prevent one or more layers of electrical cable 32A from moving or becoming loose while the tool head cuts the layers of electrical cable 32A.

In some scenarios, computing device 52 outputs commands to remove one or more layers of electrical cable 32A. In one example, a command causes a cutting tool to penetrate to a particular depth of electrical cable 32A to create a tab. Another command causes the cutting tool to partially retract the cutting tool (e.g., to a shallower cutting depth) such that the cutting tool may remove one or more exterior layers of electrical cable 32A without cutting one or more interior layers of electrical cable 32A.

In this way, computing device 52 may enable cable preparation device 50 to prepare an electrical cable faster and control the cutting depth and cutback length of cuts to one or more layers of an electrical cable more accurately than other techniques. Cutting the layers of the electrical cable more accurately may reduce defects in the electrical cable (e.g., in a cable splice). For example, cutting the layers more accurately may reduce air voids, decrease the probability and/or quantity of partial discharge events, or both. Reducing the probability and/or quantity of partial discharge events may decrease the probability of failure events of the electrical cable and increase the life expectancy of the electrical cable. Reducing the probability of failure events may increase the reliability of the power grid. Further, increasing life expectancy of the electrical cable may decrease costs of constructing, operating, and maintaining the power grid.

The examples described herein are discussed with respect to computing device 52 for purposes of example. It is understood that the functions described may be implemented by any computing device. Moreover, the term computing device is used to refer to any computing platform having one or more processors that provide an execution environment of programmable instructions. For example, a computing device may be one or more computers (e.g., servers, desktops, laptops, blade computers, virtual machines or the like) coupled to or otherwise in communication with a cable preparation device. As other examples, a computing device may be one or more processors embedded within a cable preparation device.

FIGS. 2A and 2B are conceptual diagrams of a cable preparation device 50 configured to prepare an electrical cable 350 for installation to an electrical grid, in accordance with various techniques of this disclosure. Electrical cable 350 may be an example of electrical cables 32 illustrated in FIGS. 1A and 1B.

In the example of FIG. 2A, electrical cable 350 includes a plurality of concentric (e.g., cylindrical) layers, such as central conductor 352, conductor screen 354, insulation 356, insulation screen 358, shield 360 (also referred to as sheath 360), and jacket 362. However, in some examples, electrical cable 350 may include more or fewer layers. It should be understood that the layers of cable 350 are not necessarily drawn to scale. Electrical cable 350 may be configured for AC and/or DC power transmission.

Electrical cable 350 may transmit voltages of 11 kV, 33 kV, 66 kV, 360 kV, as a few example voltages. In some instances, electrical cable 350 transmit electrical power between a power source and substation may transmit voltages of 360 kV or more, which may be considered a "transmission level voltage". In some examples, electrical cable 350 transmit voltages between 33 kV and 360 kV, such as 66 kV or 33 kV, which may be considered "subtransmission-level voltages," and may provide electrical power from a power source to an end-user or customer (e.g., customers utilizing a relatively large amount of power). As another example, electrical cable 350 that transmit electrical power between a distribution substation and a distribution transformer may transmit voltages less than 33 kV, which may be considered "distribution-level voltages." Electrical cable 350 may also transmit electrical power between a distribution substation or distribution transformer (e.g., a pad-mount transformer or pole-mount transformer) and end-users or consumers (e.g., homes and businesses) and may transmit voltages between 360 volts and 240 volts, at such voltages electrical cable 350 may be called "secondary distribution lines."

Central conductor 352 includes a conductive material, such as copper or aluminum. In some examples, central conductor 352 includes a single solid conductor or a plurality of stranded conductors. A diameter or thickness of the central conductor 352 is based on the current that electrical cable 350 is designed to transmit or conduct. In other words, the cross-sectional area of central conductor 352 is based on the current that electrical cable 350 are designed to transmit. For example, central conductor 352 may be configured to transmit currents of 1,000 amperes or more.

Conductor screen 354 may include a semi-conductive polymer, such as carbon black loaded polymer. The semi-conductive polymer may have a bulk resistivity in a range from approximately 5 to approximately 100 ohm-cm. Conductor screen 354 may be physically and electrically coupled to central conductor 352. In the example of FIG. 2, conductor screen 354 is disposed between central conductor 352 and insulation 356. Conductor screen 354 may provide a continuous conductive surface around the exterior of central conductor 352, which may reduce or eliminate sparking that might otherwise be created by central conductor 352.

In some examples, insulation 356 includes polyethylene, such as a cross-linked polyethylene (which may be abbreviated as PEX, XPE, or XLPE) or an ethylene propylene rubber (which may be abbreviated as EPR). A diameter or thickness of the insulation 356 is based on the voltage that electrical cable 350 is designed to transmit or conduct.

Insulation screen 358 may include a semi-conductive polymer similar to conductor screen 354. Insulation screen 358 is disposed between insulation 356 and shield 360. Insulation screen 358 may be coupled to insulation 356. In some examples, insulation screen 358 is electrically coupled to shield 360

Shield 360 may include a conductive material, such as a metal foil or film or wires. In some examples, shield 360 may be referred to as a "earth ground conductor."

Jacket 362, also referred to as an "oversheath," is an outer layer of electrical cable 350. Jacket 362 may be a plastic or rubber polymer, such as polyvinyl chloride (PVC), polyethylene (PE), or ethylene propylene diene monomer (EPDM).

Electrical cable 350 may include additional layers, such as a swellable or water blocking material placed within the conductor strands (e.g., a strand fill) or between various layers within electrical cable 350.

According to aspects of this disclosure, cable preparation device 50 includes computing device 52. In some examples, computing device 52 includes at least one processor 302, a communication unit 304, a power source 306, one or more sensors 308, a storage device 310, and an electrical driver 322. FIG. 2B illustrates one example of a cable preparation device 50 and computing device 52. Many other examples of computing device 52 may be used in other instances and may include a subset of the components included in example computing device 52 or may include additional components not shown in the example of FIG. 2B.

Computing device 52 includes one or more power sources 306 to provide power to components shown in computing device 52. In some examples, power sources 306 include a primary power source to provide electrical power and a secondary, backup power source to provide electrical power if the primary power source is unavailable (e.g., fails or is otherwise not providing power). In some examples, power source 306 includes a battery, such as a lithium ion battery.

One or more processors 302 may implement functionality and/or execute instructions within computing device 52. For example, processors 302 may receive and execute instructions stored by storage device 310. These instructions executed by processors 302 may cause computing device 52 to store and/or modify information, within storage devices 310 during program execution. Processors 302 may execute instructions of components, control module 320, to perform one or more operations in accordance with techniques of this disclosure. That is, control module 320 may be operable by processor 302 to perform various functions described herein.

One or more communication units 304 of computing device 52 may communicate with external devices by transmitting and/or receiving data. For example, computing device 52 may use communication units 304 to transmit and/or receive radio signals on a radio network such as a cellular radio network. Examples of communication units 304 include a network interface card (e.g. such as an Ethernet card), an optical transceiver, a radio frequency transceiver, or any other type of device that can send and/or receive information. Other examples of communication units 304 may include Bluetooth®, cellular (e.g., 3G, 4G), LPWAN, and Wi-Fi® radios. As another example, communications unit 304 may communicate with external devices by transmitting and/or receiving data via wired communication.

Computing device 52 may include one or more sensors 308. In one example, sensors 308 include one or more positions sensor to detect the position of various components of cable preparation device 50 (e.g., the position of a tool head, rollers, or cutting tools, among others). In another example, sensors 308 may include one or more velocity sensors configured to measure the velocity of various components of cable preparation device 50.

Sensors 308 may include one or more imaging devices, such as a camera or barcode scanner. For example, computing device 52 may include a plurality of cameras configured to take images of electrical cable 350 during and/or after the layers of electrical cable 350 are cut.

One or more storage devices 310 may store information for processing by processors 302. In some examples, storage device 310 is a temporary memory, meaning that a primary purpose of storage device 310 is not long-term storage. Storage device 310 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage device 310 may, in some examples, also include one or more computer-readable storage media. Storage device 310 may be configured to store larger amounts of information than volatile memory. Storage device 310 may further be configured for long-term storage of information as non-volatile memory space and retain information after activate/off cycles. Examples of non-volatile memories include, solid state drives (SSDs), magnetic storage hard disk drives (HDDs), flash memories, or forms of electrically programmable memories (EPROM) or electrically erasable and programmable (EEPROM) memories. Storage device 310 may store program instructions and/or data associated with components such as control module 320.

Storage devices 310 include electrical equipment data repository 312. Data repository 312 may include relational databases, multi-dimensional databases, maps, and hash tables, or any data structure that stores data. In some examples, electrical equipment data repository 312 includes device or equipment data, manufacturing data, installation data, consumer data, power distribution data, among others. For example, electrical equipment data repository 312 may include, for each cable accessory of cable accessories 34, data identifying a date of manufacture, a date of installation, a location (e.g., GPS coordinates, street address, etc.), entity that installed the cable accessory, a unique identifier (e.g., serial number), a type of cable accessory, etc. As another example, electrical equipment data repository 312 may include data indicating cutting dimensions for various types of electrical cables and/or cable accessories.

According to aspects of this disclosure, control module 320 may be operable by one or more processors 302 to functionality of computing device 52 as described herein. For example, control module 320 may output commands to control operation of the cable preparation device 50. In some examples, control module 320 controls cable preparation device 50 to adjust various components of cable preparation device 50 to cut the various layers of electrical cable 350. In one example, control module 320 outputs a command causing cable preparation device 50 to adjust a depth of the plurality of rollers, which may enable the tool head to support electrical cable 350 as the cutting tools cut the various layers of electrical cable 350.

In some examples, control module 320 outputs various commands to control the starting position of the cutting tools and a cutting distance (e.g., a cutting depth or cutback length) of the cutting tools. For example, control module 320 may cause the tool head to start cutting at one end of electrical cable 350. In another example, control module 320 may cause the tool head to start cutting a pre-determined distance from the end of the electrical cable 350 to create a retention band of one or more layers of electrical cable 350. The retention band may prevent one or more layers of electrical cable 350 from moving or becoming loose while the tool head cuts the layers of electrical cable 350.

In some scenarios, control module 320 outputs commands to remove one or more layers of electrical cable 350. In one example, a command causes a cutting tool to penetrate to a particular depth of electrical cable 350 to create a tab. Another command causes the cutting tool to partially retract the cutting tool (e.g., to a shallower cutting depth) such that the cutting tool may remove one or more exterior layers of electrical cable 350 without cutting one or more interior layers of electrical cable 350.

Electrical driver 322 may control characteristics of electrical power supplied to various components of cable preparation device 50. Example components of cable preparation device 50 include motors and/or actuators that drive a tool head or tool positioning driver, among others. Example characteristics of the electrical power include voltage, current, and/or frequency. In one example, electrical driver 322 outputs a command to a power converter to control the characteristics of the electrical power. In another example, electrical driver 322 includes a power converter to control the characteristics of the electrical power.

Figure 3A:
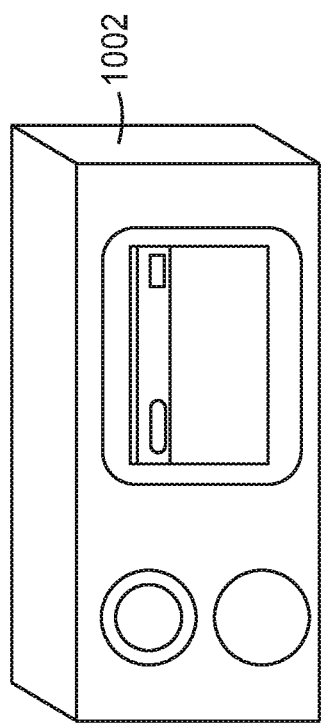
FIGS. 3A and 3B are conceptual diagrams of an example cable preparation device, in accordance with various techniques of this disclosure.
Figure 3B:
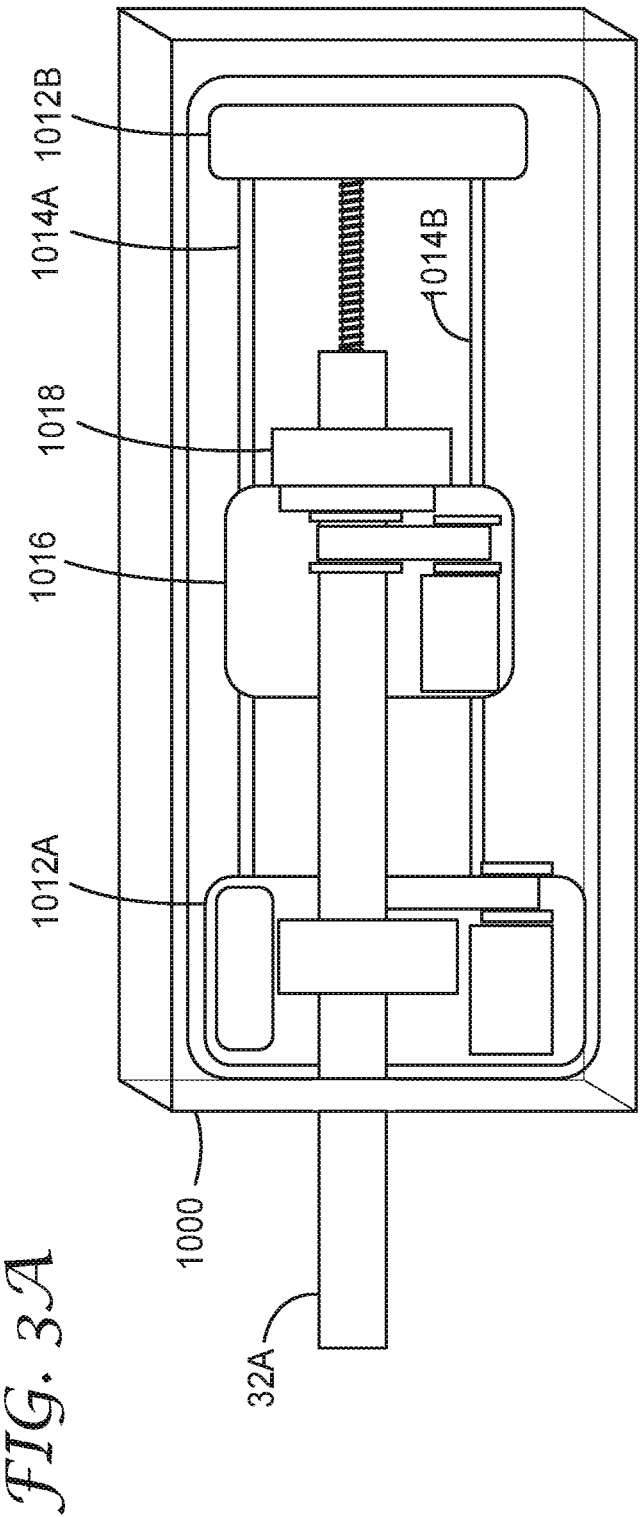

FIGS. 3A and 3B are conceptual diagrams illustrating an example cable preparation device 1000, in accordance with various techniques of this disclosure. Cable preparation device 1000 is an example of cable preparation device 50 of FIGS. 1A and 2B. Cable preparation device 1000 includes computing device 1002. Computing device 1002 may be configured to perform the functionality of computing device 52 described with reference to FIGS. 1A and 2B.

In some examples, cable preparation device 1000 includes base 1012A and 1012B (collectively, bases 1012). Bases 1012 are coupled via linear slides 1014A and 1014B (collectively, linear slides 1014). Linear slides 1014 may also be referred to as slides 1014 or linear guide rails 1014. Cable preparation device 1000 includes moving base 1016 coupled to linear slides 1014. Moving base 1016 moves longitudinally or linearly along to linear slides 1014.

Cable preparation device 1000 includes tool head 1018 (also referred to as cutting head 1018). Tool head 1018 is configured to rotate about electrical cable 32A. Tool head 1018 includes one or more cutting tools configured to cut at least one layer of electrical cable 32A (e.g., as tool head 1018 rotates about electrical cable 32A).

Computing device 1002 may be configured to control one or more components of cable preparation device 1000. In one example, computing device 1002 outputs a command causing cable preparation device 1000 to adjust a depth of the plurality of rollers, which may enable the tool head to support electrical cable 32A as the cutting tools cut the various layers of electrical cable 32A.

In some examples, computing device 1002 outputs various commands to control the starting position of the cutting tools and a cutting distance (e.g., a cutting depth or cutback length) of the cutting tools. For example, computing device 1002 may output a command to cause tool head 1018 to move longitudinally along linear rails 1014 to position the tool head at a starting position for cutting electrical cable 32A. In one example, the command causes tool head 1018 to move to the end of electrical cable 32A before cutting electrical cable 32A. In another example, computing device 1002 causes tool head 1018 to move to a position located a pre-determined distance from the end of the electrical cable 32A prior to cutting electrical cable 32A. Starting the cut a pre-determined distance from the end of electrical cable 32A may enable tool head 1018 to create a retention band of one or more layers of electrical cable 32A. The retention band may prevent one or more layers of electrical cable 32A from moving or becoming loose while the tool head cuts the layers of electrical cable 32A.

In some scenarios, computing device 1002 outputs commands to remove one or more layers of electrical cable 32A. In one example, a command causes a cutting tool to penetrate to a particular depth of electrical cable 32A to create a tab. Another command causes the cutting tool to partially retract the cutting tool (e.g., to a shallower cutting depth) such that the cutting tool of tool head 1018 may remove one or more exterior layers of electrical cable 32A without cutting one or more interior layers of electrical cable 32A.

Figure 4B:
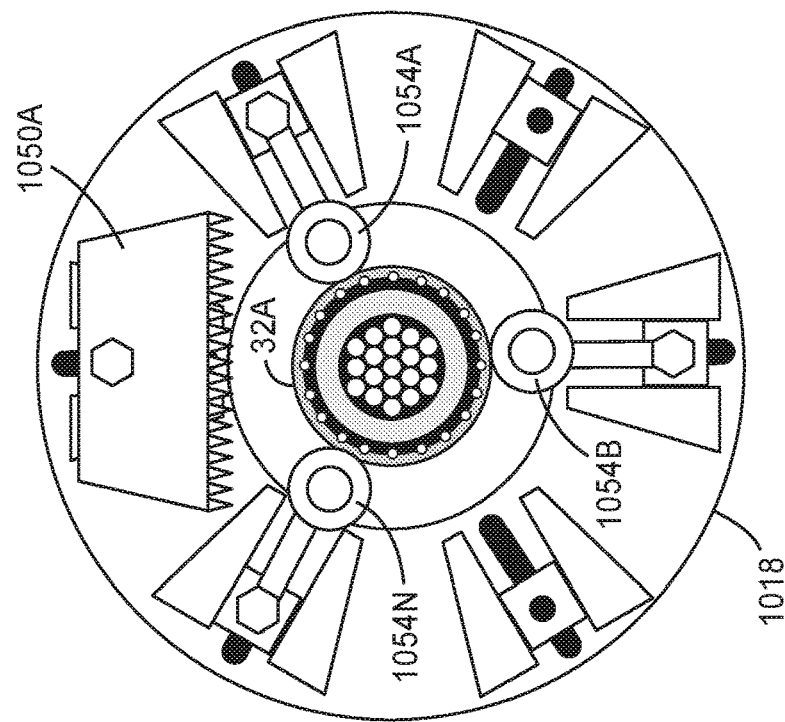
FIGS. 4A and 4B are conceptual diagrams illustrating details of an example tool head, in accordance with various techniques of this disclosure.
Figure 4A:
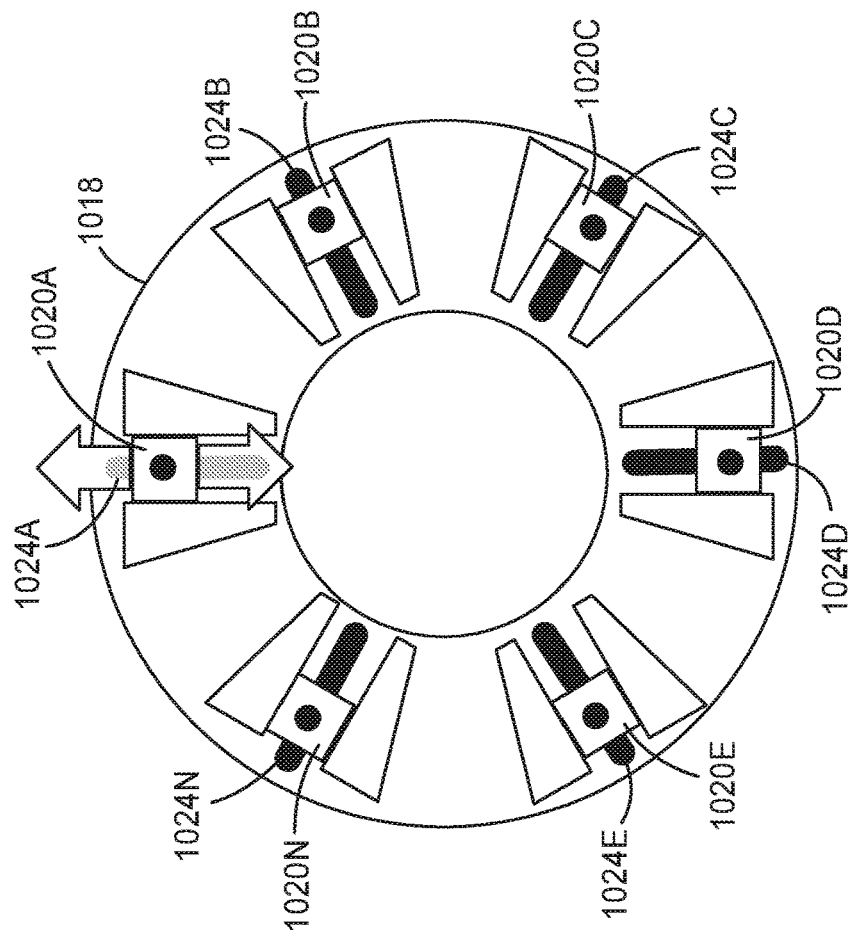

FIGS. 4A and 4B are conceptual diagrams illustrating details of an example tool head, in accordance with various techniques of this disclosure. As illustrated in FIG. 4A, tool head 1018 includes a plurality of slots 1024A-1024N (collectively, slots 1024) and a plurality of tool mounts 1020A-1020N (collectively, tool mounts 1020) configured to move radially along slots 1024 relative to a center axis of an electrical cable. In some examples, tool mounts 1020 (also referred to as slide mounts 1020) are spring loaded. Tool mounts 1020 may be configured to hold or couple one or tool head components (e.g., rollers and/or cutting tools) to move the tool head components radially. Examples of tool head components include guide rollers and cutting tools, among others.

As illustrated in FIG. 4B, tool head 1018 includes a plurality of guide rollers 1054A-1054N (collectively, guide rollers 1054 or rollers 1054) coupled to slide mounts 1020. In some instances, rollers 1054 may also be referred to as centering bearings 1054. In the example of FIG. 4B, rollers 1054 slide radially relative to the center axis of electrical cable 32A (e.g., radially inwards towards electrical cable 32A and radially outwards from electrical cable 32A). Tool head 1018 may move rollers 1054 radially inwards to contact electrical cable 32A, such that rollers 1054 may center electrical cable 32A relative to tool head 1018 while tool head 1018 rotates around electrical cable 32A. In some examples, rollers 1054 move symmetrically along respective tool mounts 1020. In other words, tool head 1018 may be configured such that radially moving roller 1054A simultaneously moves rollers 1054B and rollers 1054C. For example, rollers 1054 may be mechanically coupled to one another.

In the example of FIG. 4B, tool head 1018 includes cutting tool 1050A. Examples of cutting tools include knives, blades, saws, or any other type of tool configured to cut one or more layers of electrical cable 32A. For example, different knife blades may be implemented to create different types or depths of cuts into one or more layers of electrical cable 32A. In one example, cutting tool 1050A is positioned approximately 180 degrees (e.g., plus or minus 15 degrees) circumferentially from one of rollers 1054. (e.g., roller 1054B). In this way, when cutting tool 1050A is pressed against the electrical cable 32A, roller 1054B and cutting tool 1050A counterbalance one another such that the electrical cable 32A remains positioned in the center or approximately in the center of tool head 1018.

Figure 5:
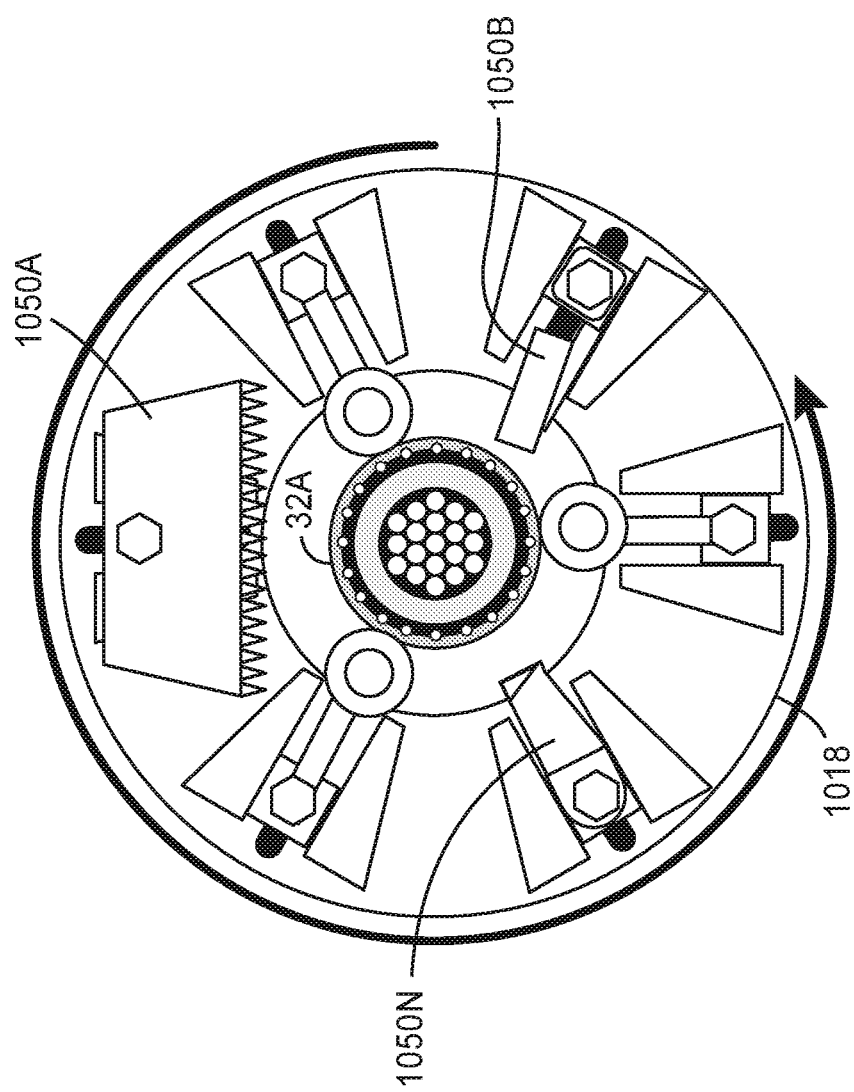
FIG. 5 is a conceptual diagram illustrating details of an example tool head, in accordance with various techniques of this disclosure.

FIG. 5 is a conceptual diagram illustrating details of an example tool head, in accordance with various techniques of this disclosure. Tool head 1018 includes a plurality of cutting tools 1050A-1050N (collectively, cutting tools 1050). In one example, each of cutting tools 1050 is positioned approximately 180 degrees (e.g., plus or minus 15 degrees) circumferentially from a respective roller of rollers 1054. In this way, when a cutting tool is pressed against the electrical cable, the roller 1054 and cutting tool 1050 counterbalance one another such that the electrical cable remains positioned in the center or approximately in the center of tool head 1018.

In one example, cutting tool 1050A is configured to cut through metal layers of electrical cable 32A, such as shield layer 360 illustrated in FIG. 2A. In some instances, cutting tool 1050A is configured to cut through all of the layers of electrical cable 32A. In other words, in such instances, cutting tool 1050A is configured to cut entirely through electrical cable 32A (e.g., in a single cut).

In another example, cutting tool 1050B is configured to make a shallow, shaving-type cut that is substantially tangent to an outer surface of an exposed layer of electrical cable 32 (e.g., in order to reduce a thickness of a portion of the exposed layer). Cutting tool 1050B may be configured to score an insulation layer or insulation screen (e.g., insulation 356 or insulation screen 358 as illustrated in FIG. 2A, respectively). As another example, cutting tool 1050B may be configured to cut a metal shield layer (e.g., a tape, a foil, a wire, etc.).

In one example, cutting tool 1050N is configured to cut and remove one or more layers of electrical cable 32A. For example, cutting tool 1050N may be configured to perform a spiral cut (also referred to as a helical cut) of jacket 362, insulation screen 358, insulation 356, or a combination thereof.

FIGS. 6A-6F are conceptual diagrams illustrating an example technique for operating an example tool head of cable preparation device 1000 (FIG. 3B). Cable preparation device 1000 includes a tool positioning driver 1026. Tool positioning driver 1026 may be configured to adjust a radial depth (also referred to as a radial position) of tool head components of tool head 1018. The radial depth may refer to the distance between the center axis of electrical cable 32A and a portion of the tool head component (e.g., a surface of a cutting tool or roller).

Figure 6B:
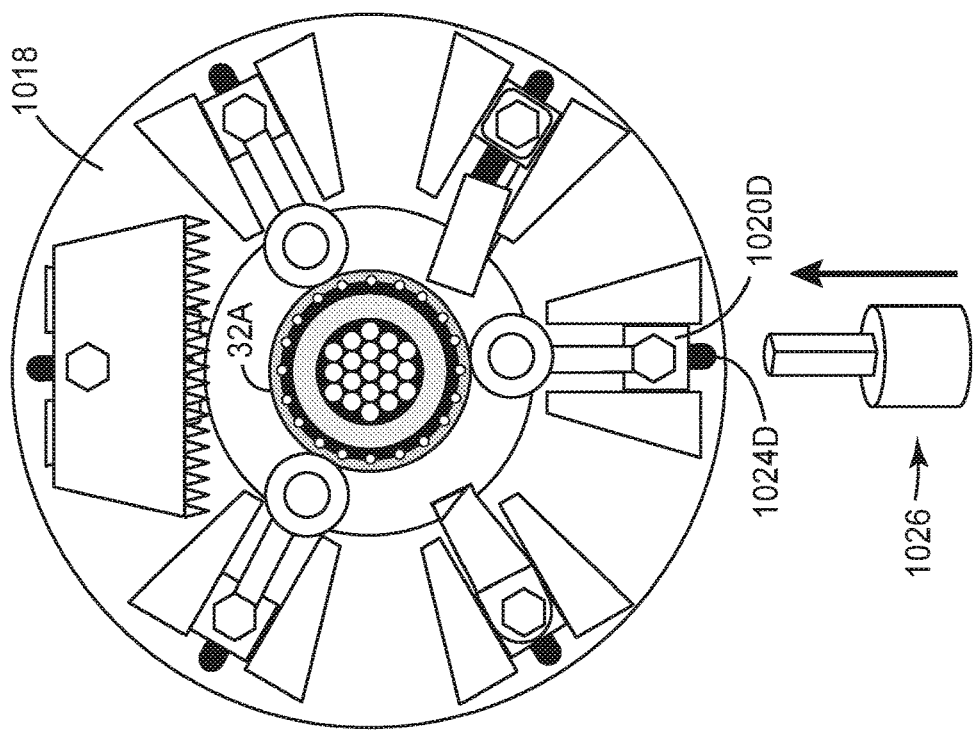
Figure 6A:
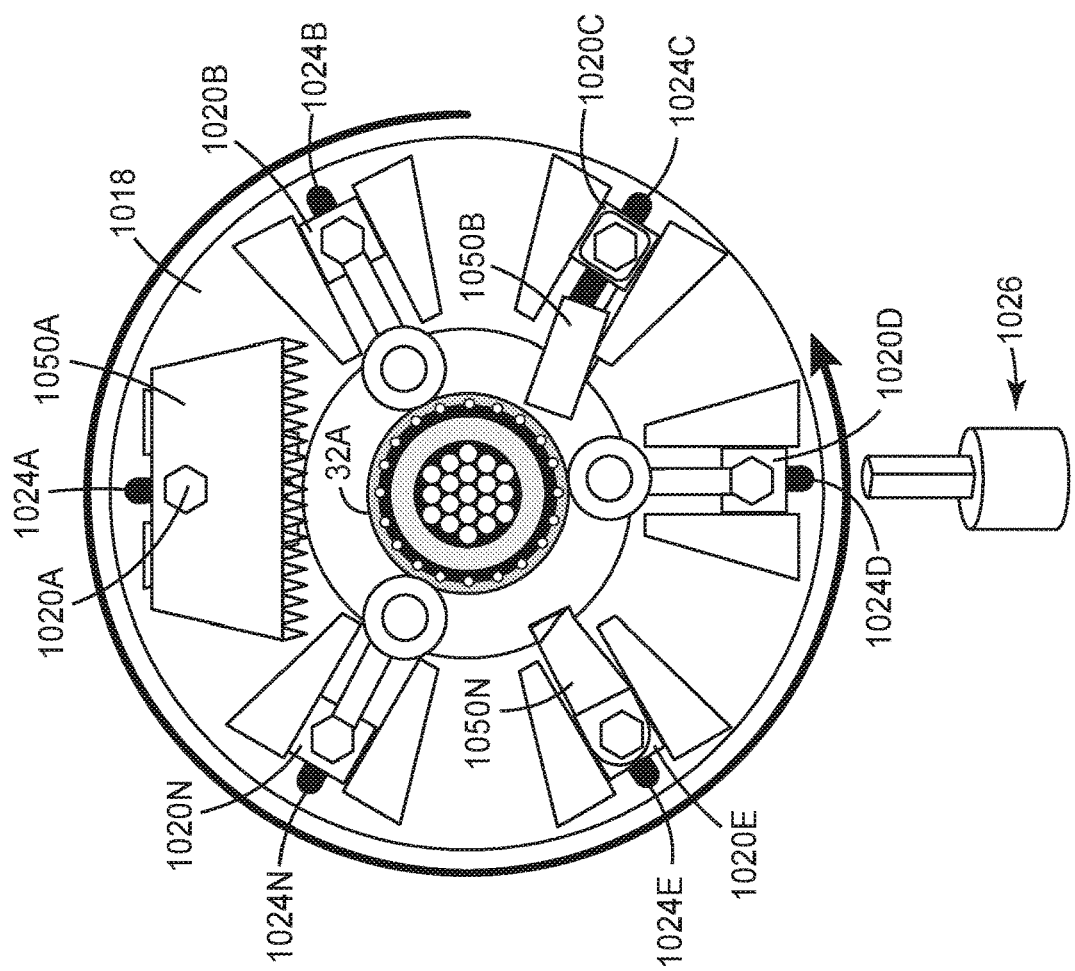

As illustrated in FIG. 6A, tool head 1018 rotates to align tool position driver 1026 with one of slots 1024 (e.g., slot 1024D). In the example of FIG. 6B, tool positioning driver 1026 extends or inserts into slot 1024D to engage with a tool mount (e.g., tool mount 1020D). In one example, tool mounts 1020 each include a recess (e.g., a slot, a torx socket, a hex socket, or any other type of recess) configured to receive tool positioning driver 1026. In some instances, tool positioning driver 1026 is actuated (e.g., inserted or retracted) via a solenoid, a cam shaft, a pneumatic piston, or other mechanism configured to adjust the radial depth of tool positioning driver 1026.

Figure 6D:
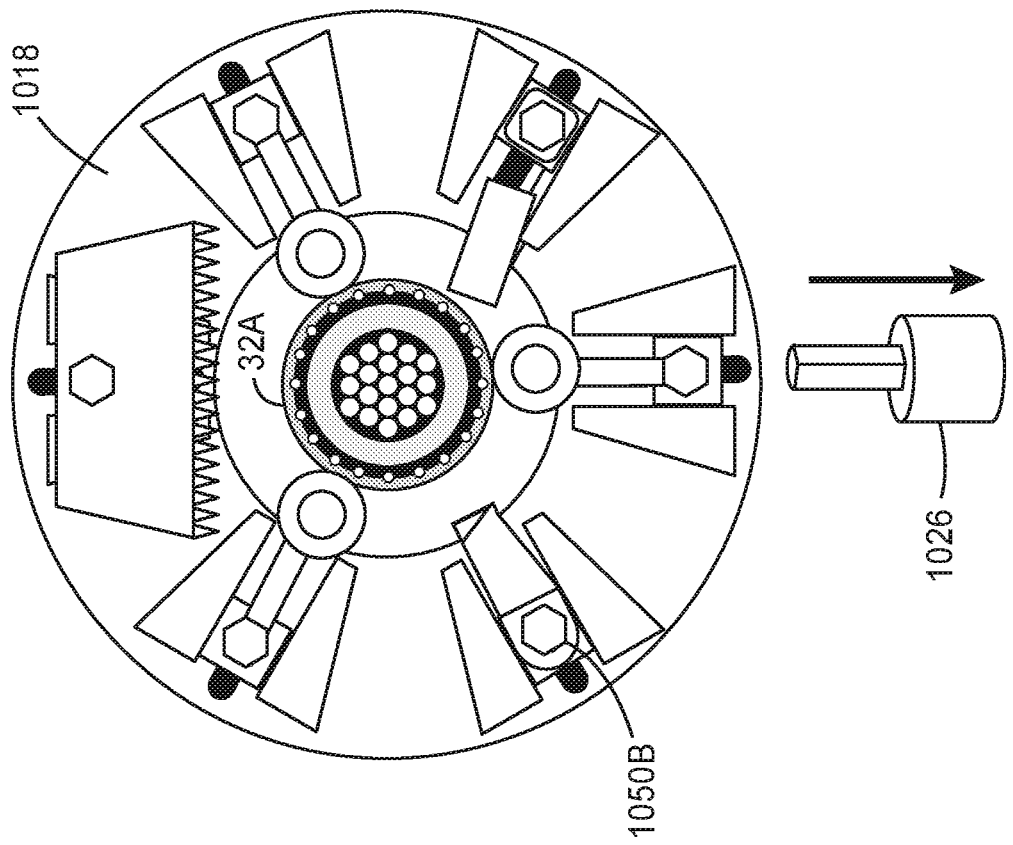
Figure 6C:
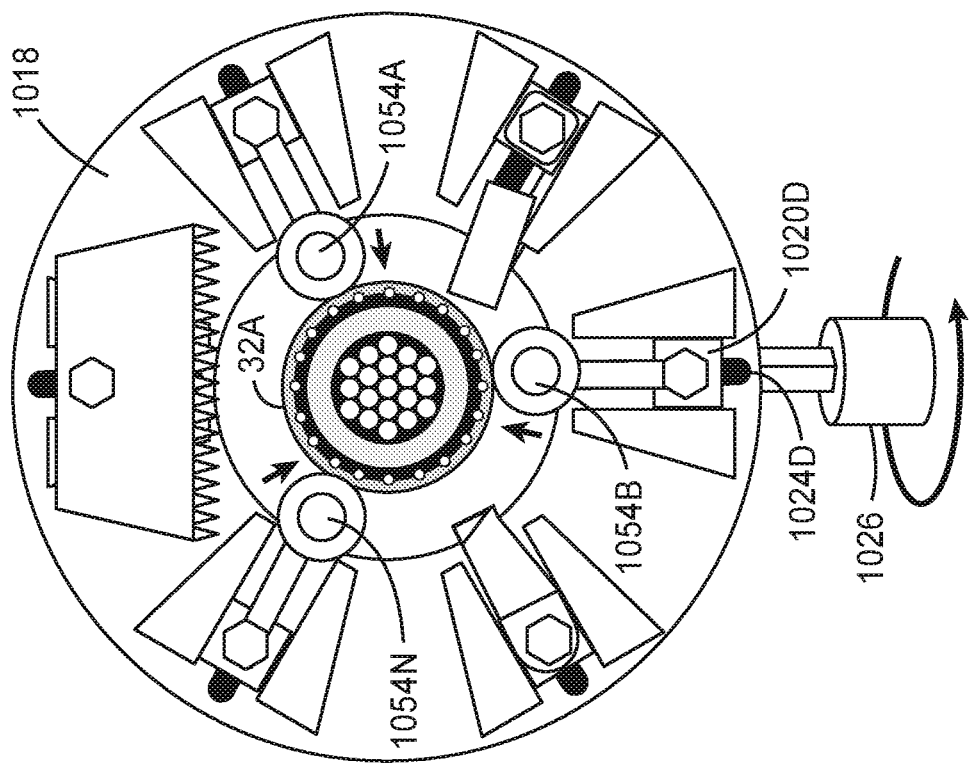

In some examples, such as the example of FIG. 6C, tool positioning driver 1026 rotates to adjust the radial depth of tool mount 1020D, and hence, roller 1054B attached to tool mount 1020D. For example, tool positioning driver 1026 may rotate (e.g., counter-clockwise) to push roller 1054B towards electrical cable 32. In one example, rollers 1054 are configured to move symmetrically. In other words, tool positioning driver 1026 may adjust a radial depth of each of rollers 1054 by adjusting a depth of tool mount 1020D attached to roller 1054B. In one example, tool positioning driver 1026 may push rollers 1054 to a predetermined radial depth (e.g., based on a type of electrical cable 32A). In another example, tool positioning driver 1026 may push rollers 1054 until the resistance or force against rollers 1054 or tool positioning driver 1026 satisfies (e.g., is greater than or equal to) a threshold resistance or force, or until the resistance or force is within a particular range of resistance or force. In one example, computing device 1002 determines whether rollers 1054 are at the proper radial depth to maintain electrical cable 32A in a proper cutting position (e.g., centered within tool head 1018). For example, computing device 1002 may receive sensor data indicative of a mechanical resistance or force experience by rollers 1054 or tool positioning driver 1026 and determine whether rollers 1054 are at the proper radial depth. In another example, computing device 1002 may receive sensor data indicative of the radial position of rollers 1054 to determine whether rollers 1054 are at the proper radial depth.

As shown in FIG. 6D, tool positioning driver 1026 may withdraw or be extracted from slot 1024D once rollers 1054 are at the proper depth (e.g., at the pre-determined depth, or when the resistance or force satisfies the threshold resistance or force).

Tool head 1018 may rotate to align tool positioning driver 1026 with another slot (e.g., slot 1024E) after withdrawing tool positioning driver 1026 from slot 1024D, as illustrated by FIG. 6E. Tool positioning driver 1026 may insert into slot 1024E upon slots 1024E aligning with tool positioning driver 1026.

As shown in FIG. 6F, tool positioning driver 1026 may adjust a radial depth of tool mount 1020E and cutting tool 1050N coupled to tool mount 1020E. For example, tool positioning driver 1026 may engage a recess of tool mount 1020E and may rotate to adjust the radial depth (e.g., a target cutting depth) of tool mount 1020E. For example, tool positioning driver 1026 may push tool mount 1020E to a predetermined radial cutting depth (e.g., based on a type of electrical cable 32A) or until the resistance or force against cutting tool 1050N or tool positioning driver 1026 satisfies (e.g., is greater than or equal to) a threshold resistance or force. In one example, computing device 1002 determines whether the radial depth of cutting tool 1050N is the correct or proper depth. For example, computing device 1002 may determine whether the cutting tool 1050N is at the proper cutting depth based on sensor data. For instance, computing device 1002 may determine whether cutting tool 1050N is at the proper cutting depth (also referred to as the target cutting depth) based on sensor data indicative of a mechanical resistance experienced by cutting tool 1050N or tool positioning driver 1026. In another instance, computing device 1002 determines whether cutting tool 1050N is at the proper cutting depth based on sensor data indicative of electrical characteristics of cutting tool 1050N (e.g., an electrical resistance or capacitance or cutting tool 1050N). For instance, the electrical characteristics of cutting tool 1050N may change as cutting tool 1050N cuts through a jacket layer of electrical cable 32A and approaches and/or contacts shield layer. As yet another example, computing device 1002 may determine whether cutting tool 1050N is at the proper cutting depth based on images generated by an image sensor (e.g., a camera), ultrasonic sensor, or data from any other sensor.

In some examples, cable preparation device 1000 includes one or more clamps configured to move radially relative to the longitudinal axis of electrical cable 32A. The one or more clamps may be configured to restrict motion (e.g., rotational or longitudinal) of electrical cable 32A. In some examples, the clamps may enable blades pitched at an angle relative to the axis of the cable (e.g., to spiral cut a layer of the cable) to make a cut substantially perpendicular or normal to the axis of the cable.

Figure 7:
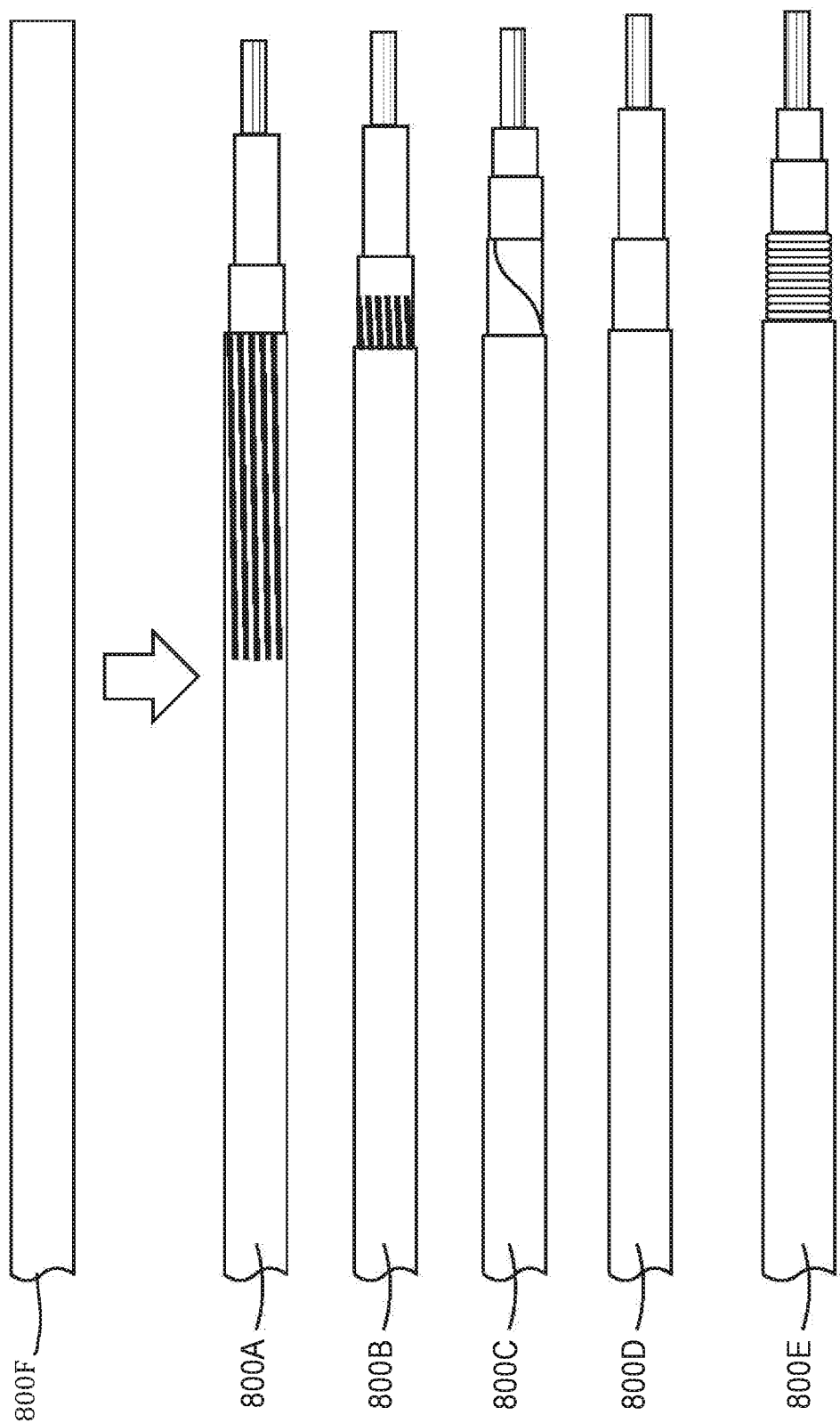
FIG. 7 is a conceptual diagram illustrating details of an example electrical cable preparation technique, in accordance with various techniques of this disclosure.

FIG. 7 is a conceptual diagram illustrating details of example electrical cables, in accordance with various techniques of this disclosure. In some examples, each of electrical cables 800A-800F (collectively, electrical cables 800) are a different type of electrical cable. FIG. 7 illustrates example electrical cables 800 during various stages of preparation of electrical cables 800 by a cable preparation device (e.g., cable preparation device 1000 of FIG. 3B). That is, various portions of various layers of each of electrical cables 800 have been removed to prepare each of electrical cables 800 to be coupled to a cable accessory, such as a cable splice or termination.

Figure 8:
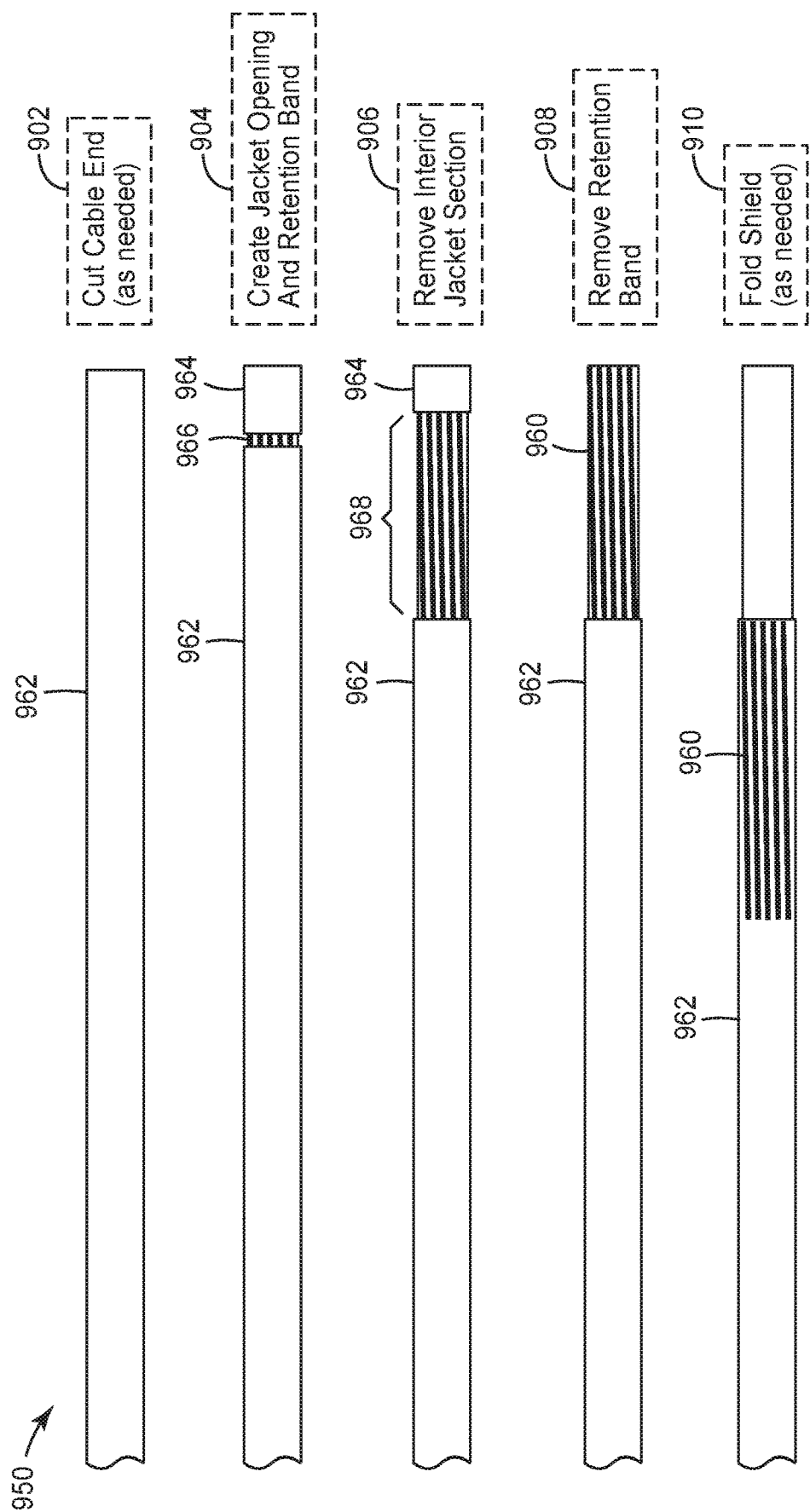
FIG. 8 is a conceptual diagram illustrating details of an example technique of preparing an example electrical cable using a cable preparation device, in accordance with various techniques of this disclosure.
Figure 9B:
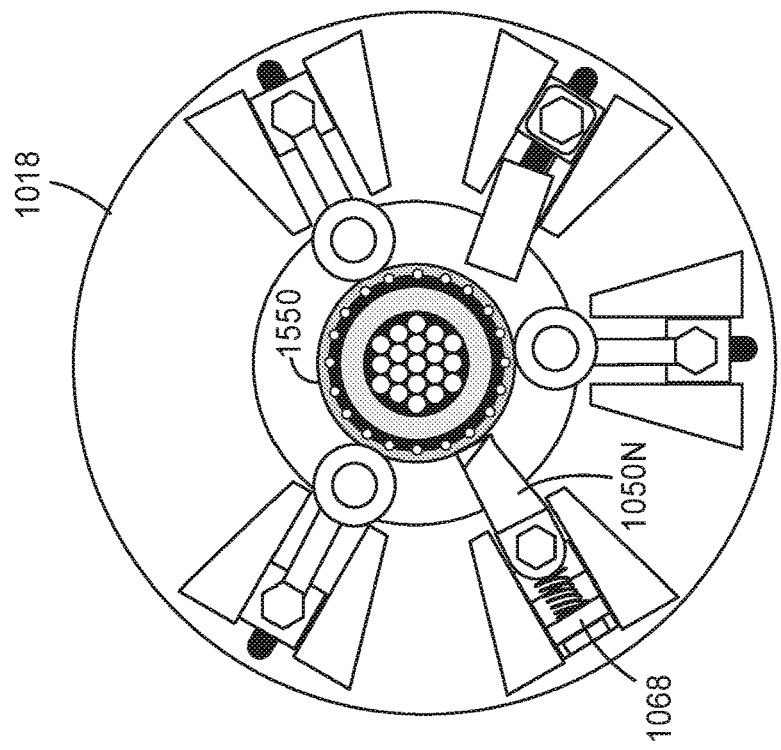
Figure 9A:
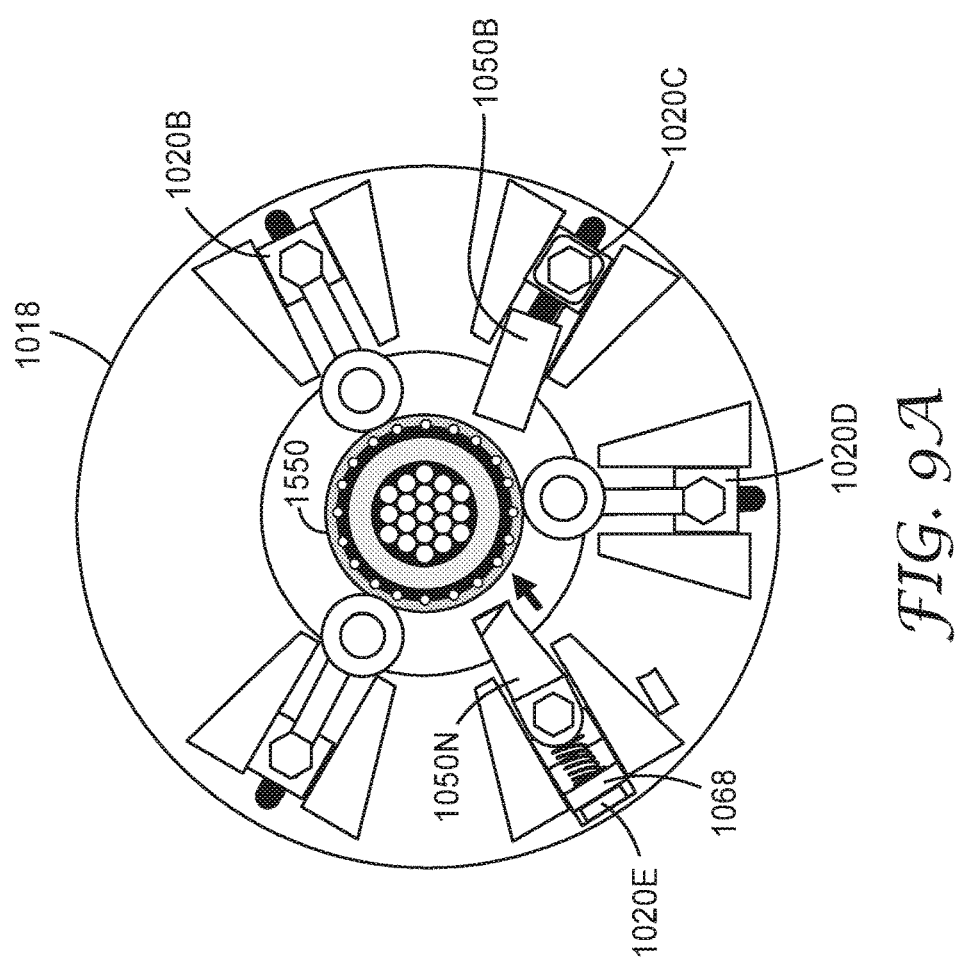

FIG. 8 is a conceptual diagram illustrating details of an example technique of preparing an example electrical cable 950 utilizing a cable preparation device, in accordance with various techniques of this disclosure. FIG. 8 is described with reference to cable preparation device 1000 of FIG. 3. However, other cable preparation devices may be used to perform the functionality described with reference to FIG. 8.

In some examples, cable preparation device 1000 cuts through each layer of electrical cable 950 (902). In one example, cutting tool 1050A of tool head 1018 of cable preparation device 1000 is configured to cut (e.g., circumferentially) through the entirety of electrical cable 950, which may provide a relatively clean edge to electrical cable 950 (e.g., relative to an electrical cable with a frayed or worn end).

In the example of FIG. 8, tool head 1018 creates a jacket opening 966 and creates a retention band 964 (904). For example, tool head 1018 may move longitudinally along slides 1014 to a starting position at which tool head 1018 will begin cutting electrical cable 950 to create the jacket opening 966. The longitudinal starting position may be located at a longitudinal reference position (e.g., the end of electrical cable 950) or a predetermined distance from the longitudinal reference position. The longitudinal reference position may also be referred to as a zero point or zero position. In some examples, the predetermined distance is based on a pre-defined retention band distance (RBD) or a target cutback length for one or more layers of electrical cable 950. Tool head 1018 may move to the longitudinal starting position in response to receiving a command from computing device 1002. As illustrated in FIG. 8, tool head 1018 moves longitudinally to a longitudinal starting position located a retention band distance from the end of electrical cable 950. In some examples, responsive to tool head 1018 moving to the longitudinal starting position, one of cutting tools 1050 (e.g., cutting tool 1050A or 1050B) moves radially towards electrical cable 950 and cuts to a radial target cutting depth to cut through at least a jacket layer 962 of electrical cable 950 to create jacket opening 966. For example, tool head 1018 may cut a radial distance through jacket layer 962 by rotating tool head 1018 around electrical cable 950. In this way, in one example, tool head 1018 may cut through the jacket layer 962 of electrical cable to separate a retention band 964 from the remaining jacket layer 962.

In some examples, tool head 1018 cuts through an interior portion 968 (also referred to as an interior section) of jacket layer 962 after separating retention band 964 from the rest of jacket layer 962 (906). The interior portion of jacket layer 962 may be defined by the longitudinal starting position and a position defined by a target cutback length for jacket layer 962. In some examples, tool head 1018 moves longitudinally along slides 1004 to a target cutback length further while one of cutting tools 1050 is positioned at the target cutting depth to cut jacket layer 962. For example, tool head 1018 may utilize cutting tool 1050N to remove jacket layer 962 from electrical cable 950.

In one example, the cutting angle of a cutting tool used to cut one layer (e.g., jacket layer 962) of the electrical cable may be steeper than the cutting angle of a cutting tool used to cut another layer (e.g., an insulation layer). In some examples, cutting tool 1050N may include a relatively low cutting angle. In examples where cutting tool 1050N includes a low cutting angle, the cutting angle between a blade of cutting tool 1050N and the surface of electrical cable 950 may be approximately 20 degrees (e.g., plus or minus 5 degrees). A relatively low angle may improve the ability of cutting tool 1050N to remove one or more insulation layers of electrical cable 950. In another example, cutting tool 1050N includes a relatively high cutting angle. In an example where cutting tool 1050N includes a high cutting angle, the cutting angle between the blade of cutting tool 1050N and the surface of electrical cable 950 may be approximately 60 degrees (e.g., plus or minus 20 degrees). In this way, a relatively high cutting angle may improve the ability of cutting tool 1050N to remove jacket layer 962.

In some examples, tool positioning driver 1026 may adjust the radial distance of cutting tool 1050A (or 1050B) to extract cutting tool 1050A (or 1050B) away from electrical cable 950 and may position cutting tool 1050N at the target cutting depth. In some examples, cable preparation device 1000 performs a straight cut by moving tool head 1018 longitudinally without rotating tool head 1018 while cutting jacket layer 962. In another example, cable preparation device 1000 performs a spiral cut by moving tool head 1018 longitudinally and simultaneously rotating tool head 1018 about or around electrical cable 950. In one example, upon reaching the position defined by the target cutback length, one of cutting tools 1050 performs a circumferential cut to remove an interior portion of jacket layer 962. For example, tool head 1018 may remain longitudinally fixed at the target cutback length and cutting tool 1050N may remain at the target cutting depth while tool head 1018 rotates about electrical cable 950 to terminate the cut to jacket layer 962 by removing an interior portion of jacket layer 962.

Cable preparation device 1000 removes retention band 964 (908). In one example, cable preparation device 1000 removes retention band 964 by cutting retention band 964 after removing the interior portion of jacket layer 962 (908). For example, tool head 1018 may move longitudinally towards the starting position and one of cutting tools 1050 may cut through jacket layer 962 as tool head 1018 moves longitudinally towards the end of electrical cable 950 to remove retention band 964. In some examples, a user of cable preparation device 1000 may remove retention band 964. Removing the interior portion of jacket layer 962 while retaining retention band 964 may enable cable preparation device 1000 to remove the interior portion of jacket layer 962 and optionally additional layers (e.g., shield 960) while securing the end of the various layers. Securing the ends of the respective layers may prevent the layers of electrical cable 950 from fraying while cutting and removing the layers of electrical cable 950, which may simplify removal of the layers of electrical cable 950 and potentially reduce or eliminate defects in electrical cable caused while preparing the layers of electrical cable 950.

In some examples, cable preparation device 1000 may fold shield 960 or conductor screen 354 (910). For example, cable preparation device 1000 may fold shield 960 on top of the remaining portion of jacket 962. In another example, a user of cable preparation device 1000 may fold shield 960.

FIGS. 9A-9D are conceptual diagrams illustrating details of an example technique of preparing an example electrical cable utilizing a cable preparation device, in accordance with various techniques of this disclosure. FIGS. 9A-9D are described with reference to cable preparation device 1000 of FIG. 3B, however, other cable preparation devices may be used to perform the described functionality.

Tool head 1018 creates a jacket opening 1466 and creates a retention band 1464. For example, tool head 1018 may move longitudinally along slides 1014 to a starting position at which tool head 1018 will begin cutting electrical cable 1450 to create the jacket opening 1466. Responsive to tool head 1018 moving to the longitudinal starting position, one of cutting tools 1050 (e.g., cutting tool 1050B) moves radially towards electrical cable 1450 (1402). Cutting tool 1052B cuts to a target cutting depth to cut through at least a jacket layer 1462 of electrical cable 1450 (1404). Tool head 1018 rotates around electrical cable 1450 (1406) to circumferentially cut through jacket layer 1462 to create retention band 1464.

In some examples, cable preparation device 1000 removes an interior portion 1568 of jacket layer 1562 after creating a retention band 1564. Cable preparation device 1000 may utilize one cutting tool (e.g., cutting tool 1050B) to create retention band 1564 and a different cutting tool (e.g., cutting tool 1050N) to remove the interior portion of jacket layer 1562. In one example, after creating retention band 1564, cable preparation device 1000 may adjust the radial depth of cutting tool 1050B outwards from electrical cable 1550. Cable preparation device 1000 may adjust the radial depth of cutting tool 1050N towards electrical cable 1550 after adjusting the depth of cutting tool 1050B outward. For example, cable preparation device 1000 may adjust a radial depth of tool mount 1020D and cutting tool 1050B coupled to tool mount 1020D to a predetermined radial cutting depth (e.g., based on a type of electrical cable 1550) or until the resistance or force against cutting tool 1050B or tool positioning driver 1026 satisfies (e.g., is greater than or equal to) a threshold resistance or force.

In some examples, cutting tool 1050N is spring loaded. In one example, cutting tool 1050N or tool mount 1020N includes a spring assembly 1067 configured to move cutting tool 1050N in the radial direction. For example, cutting tool 1050N may be mounted to tool mount 1020N via spring 1068. In such examples, cable preparation device 1000 may compress spring 1068, which may cause cutting tool 1050N to cut at least partially through jacket layer 1062 to a first target cutting depth.

Tool head 1018 may rotate a partial rotation while cutting tool 1050N is at the first target cutting depth. Rotating tool head 1018 a partial rotation may enable cutting tool 1050N to create tab 1570.

Figure 10B:
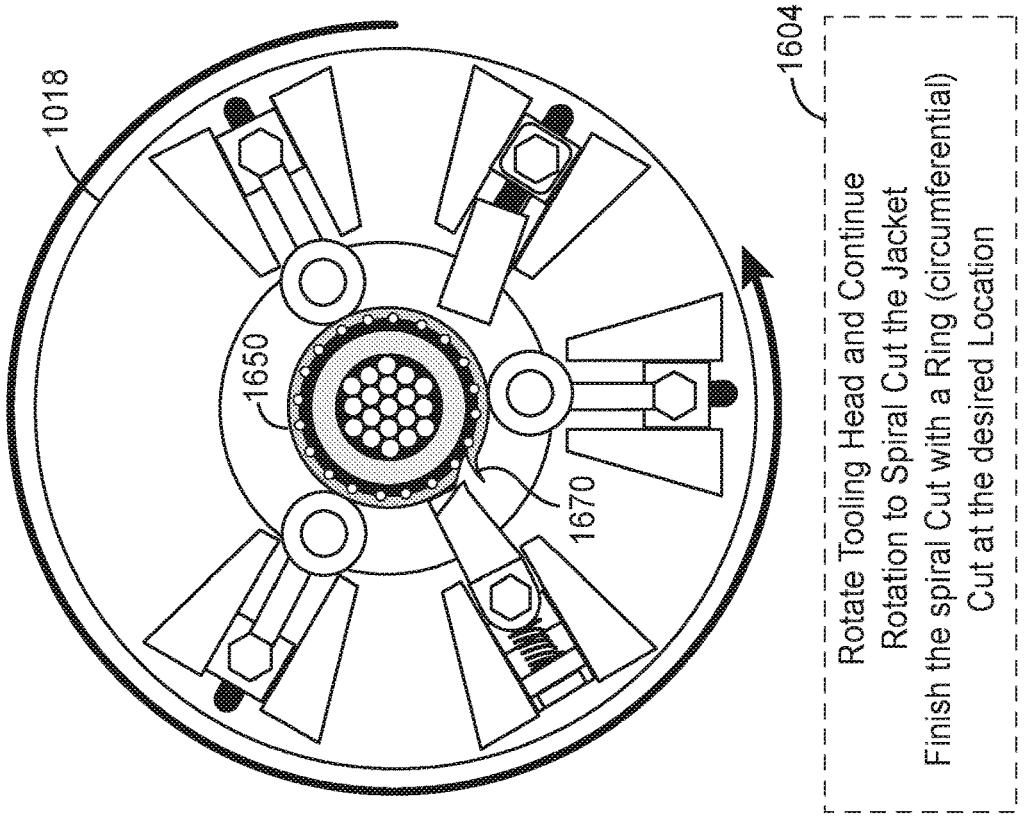
Figure 10A:
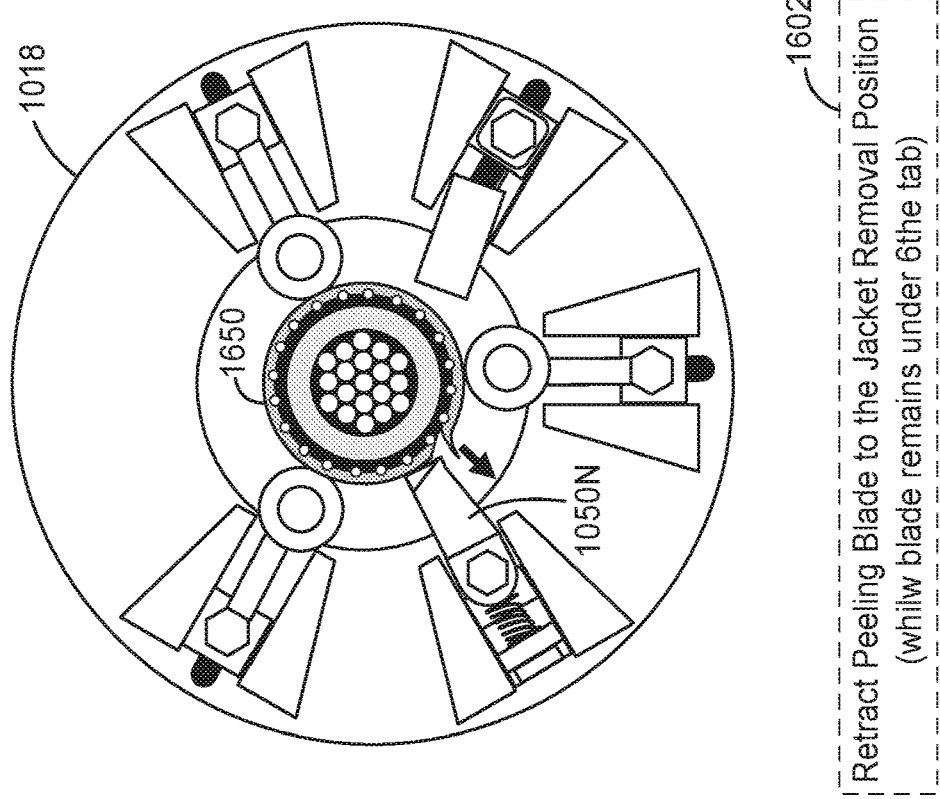

FIGS. 10A-10C are conceptual diagrams illustrating details of an example technique of preparing an example electrical cable using a cable preparation device, in accordance with various techniques of this disclosure. FIGS. 10A-10C are described with reference to cable preparation device 1000 of FIG. 3B, however, other cable preparation devices may be used to perform the described functionality.

In some examples, after creating a tab 1670, cable preparation device 1000 may remove an interior portion of jacket layer 1662. In some examples, cable preparation device performs a radial or longitudinal cut at the same cutting depth as used to create tab 1670. In other words, in one example, cutting tool 1050N remains at the first target cutting depth when cutting through jacket layer 1662 to remove the interior portion of jacket layer 1662.

In another example, cable preparation device 1000 adjusts the depth of cutting tool 1050N to a second target cutting depth that is shallower than the first target cutting depth (1602). In other words, cable preparation device 1000 may retract cutting tool 1050N to the second target cutting depth. The second target cutting depth may be within a threshold depth of the first target cutting depth, which may enable cutting tool 1050N to remain under jacket layer 1662 (e.g., without interfering with an adjacent layer, such as a shield layer). Retracting cutting tool 1050N to the second target cutting depth may lift tab 1670 from another layer adjacent to jacket layer 1662 (e.g., a shield layer). In this way, cable preparation device may perform a spiral cut at the second target cutting depth to lift and remove the interior portion of jacket layer 1662 from electrical cable 1650. In some examples, the second target cutting depth is also referred to as a jacket removal depth or a jacket removal position.

Tool head 1018 may remove the interior portion of jacket layer 1662 (1604). In one example, tool head 1018 rotates with cutting tool 1050N at the second target cutting while moving longitudinally along slides 1014. For example, tool head 1018 may move longitudinally from the longitudinal starting position to a position defined by a target cutback length for jacket layer 1662. In one example, upon arriving at the position defined by the target cutback length, one of cutting tools 1050 performs a circumferential cut to remove the interior portion of jacket layer 1662. For example, tool head 1018 may perform a circumferential cut by rotating about electrical cable 1650 to terminate the cut to jacket layer 1662 and remove the interior portion of jacket layer 1662.

Figure 11:
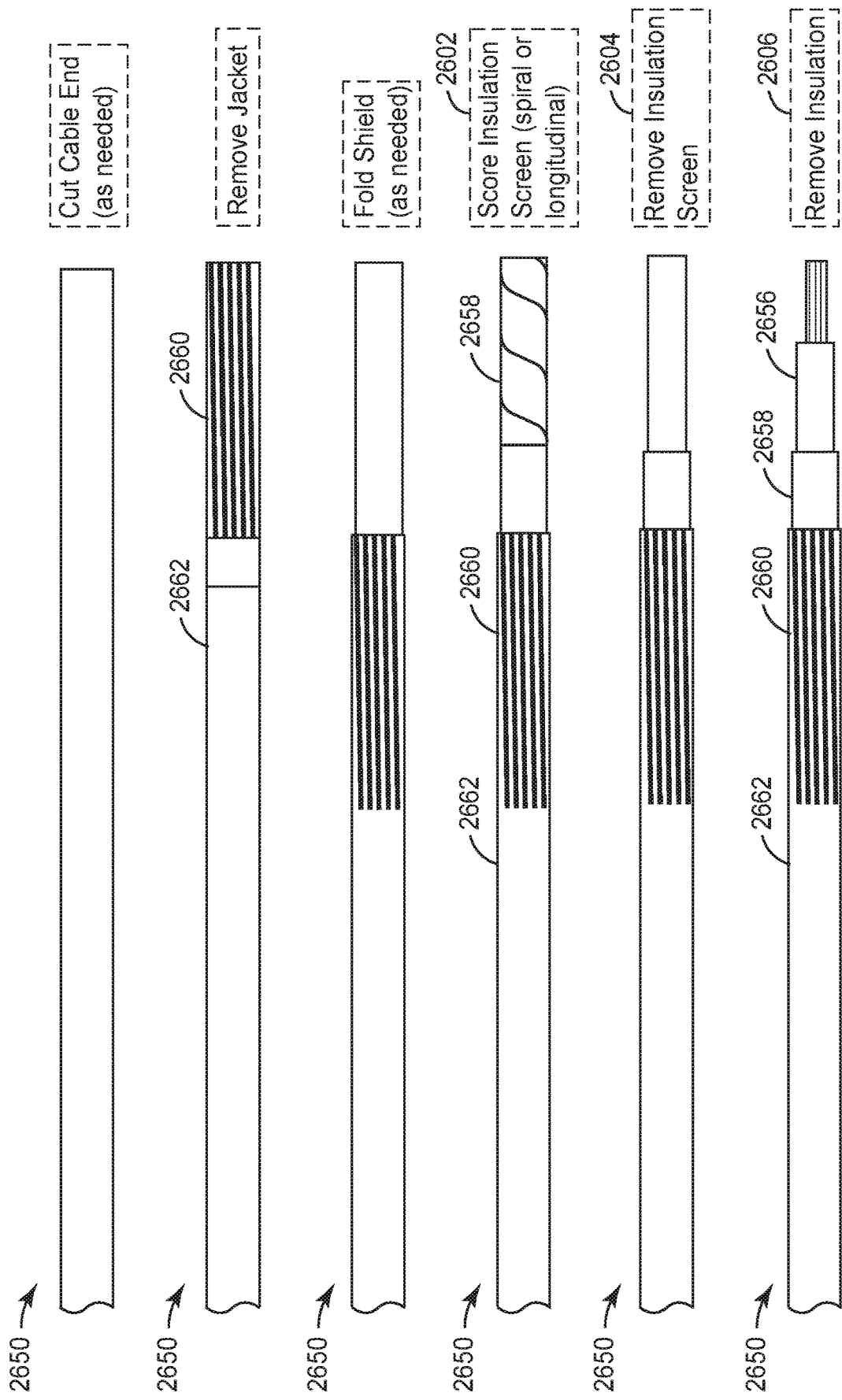
FIG. 11 is a conceptual diagram illustrating details of an example technique of preparing an example electrical cable using a cable preparation device, in accordance with various techniques of this disclosure.

FIG. 11 is a conceptual diagram illustrating details of an example technique of preparing an example electrical cable using a cable preparation device, in accordance with various techniques of this disclosure. FIG. 11 is described with reference to cable preparation device 1000 of FIG. 3B, however, other cable preparation devices may be used to perform the described functionality.

Cable preparation device 1000 may remove a portion of jacket layer 2662 and shield 2660. Responsive to folding shield 2660, cable preparation device may remove an insulation screen layer, an insulation layer, or both. For example, cable preparation device 1000 may cut or score a portion of insulation screen 2658 via a spiral cut or longitudinal cut (2602). Cable preparation device 1000 may circumferentially cut insulation screen 2658 (2604) to remove the portion of insulation screen 2658. After removing insulation screen 2658, cable preparation device 1000 may remove a portion of insulation 2656 (2606). For example, cable preparation device 1000 may cut or score insulation 2656 via a spiral cut or longitudinal cut. Cable preparation device 1000 may perform a circumferential cut to remove the portion of insulation 2656 after scoring insulation 2656.

Figure 12:
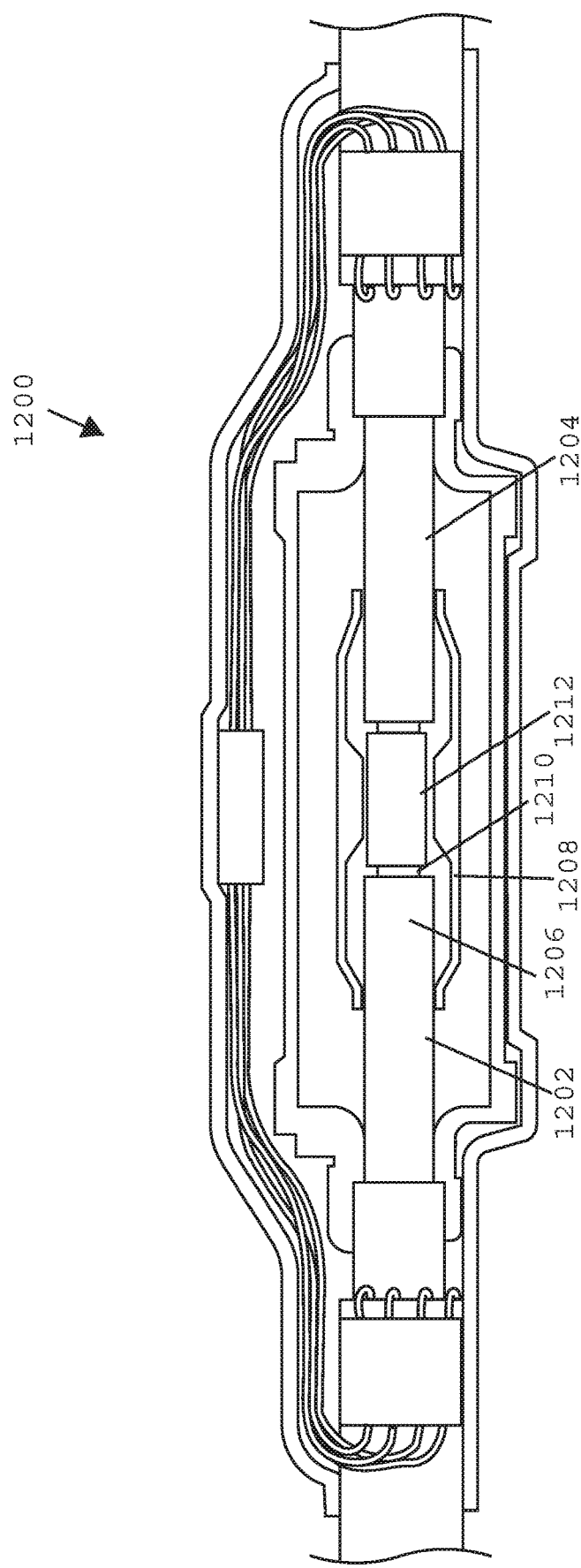
FIG. 12 is a conceptual diagram illustrating details of an example electrical cable accessory and connector coupling two electrical cables, in accordance with various techniques of this disclosure.

FIG. 12 is a conceptual diagram illustrating details of an example electrical cable splice 1200 coupling two electrical cables 1202 and 1204, in accordance with various techniques of this disclosure. In a typical splice installation, some insulation 1206 near the cable end is under the splice electrode 1208 which is at the same electrical potential as the center conductor 1210 and connector 1212. Although surface damage to the insulation 1206 outside of this region may cause air voids and partial discharge when energized, surface defects in this area will not give rise to partial discharge because of the equal electrical potential. Separable connectors also typically have electrode regions and therefore can tolerate insulation damage in some local areas, while terminations can have lower electrical field strength near the cable ends with some tolerance to insulation damage in local areas.

Figure 13A:
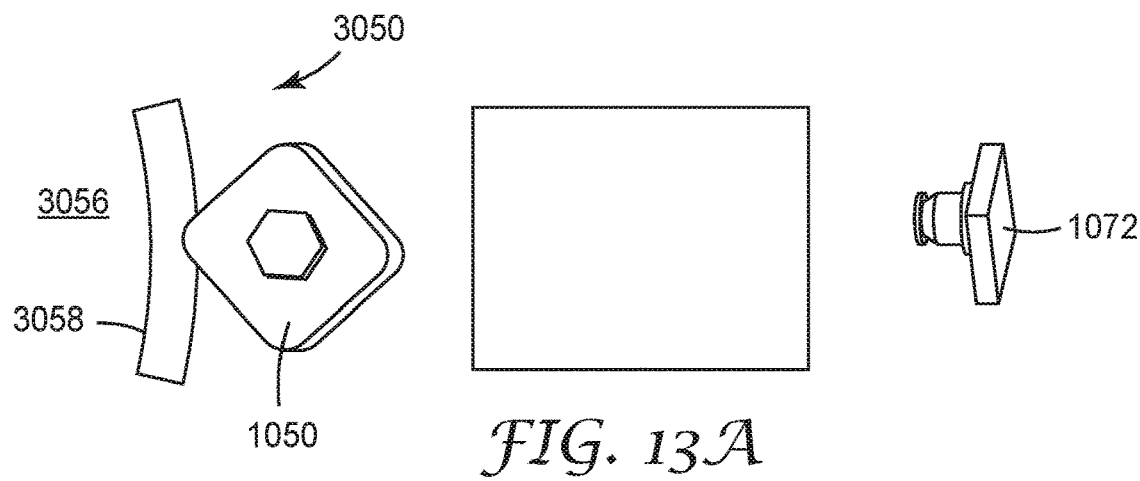
FIGS. 13A-13C are conceptual diagrams illustrating an example technique of preparing an example electrical cable using a cable preparation device having a camera, in accordance with various techniques of this disclosure.
Figure 13B:
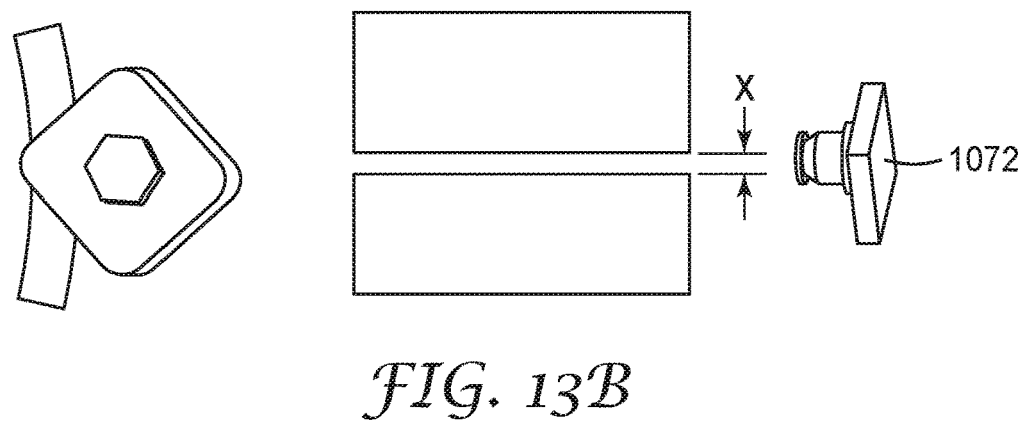
Figure 13C:
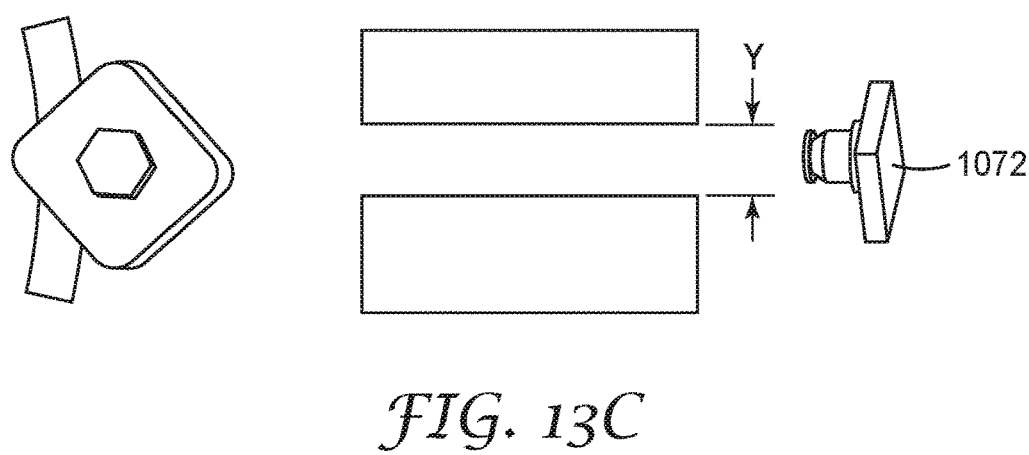

FIGS. 13A-13C are conceptual diagrams illustrating details of an example technique of preparing an example electrical cable using a cable preparation device having a camera, in accordance with various techniques of this disclosure. FIGS. 13A-13C are described with reference to cable preparation device 1000 of FIG. 3, however, other cable preparation devices may be used to perform the described functionality.

Cable preparation device 1000 may include one or more cameras 1072 configured to generate images of the electrical cable 3050 during and/or after cutting electrical cable 3050. Cameras 1072 may generate one or more images of a cross-sectional of electrical cable 3050, of a longitudinal surface of electrical cable 3050, or both.

Computing device 1002 may determine the target cutting depth for one or more layers of electrical cable 3050 based on one or more images generated by cameras 1072. In some examples, computing device 1002 determines the target cutting depth based on a contrast in color of the various layers of electrical cable 3050. For example, a first layer (e.g., insulation 3056) may be substantially one color (e.g., black) and the adjoining layer (e.g., an insulation screen 3058) may be substantially another color (e.g., white) having a relatively large contrast to the first color. In such examples, a contrast in colors may indicate that cutting tool 1050B has cut through an entire layer of an electrical cable. Computing device 1002 may determine the actual cutting depth of one of cutting tools 1050 (e.g., cutting tool 1050B) in response to detecting a contrast in colors in one or more images generated by cameras 1072. In some examples, computing device 1002 determines the target cutting depth (also referred to as an optimum scoring depth) for one or more layers is equal to the actual cutting depth at which the contrast in colors was detected in the images.

In one example, computing device 1002 may determine the targeting cutting depth for a particular layer (e.g., insulation screen 358) based on a plurality of images associated with a plurality of cuts. For example, cable preparation device 1000 may extend cutting tool 1050N into the particular layer a plurality of times at successively deeper cuts (3001) and cameras 1072 may generate one or more images for each of the cuts. In such examples, computing device 1002 may determine the target cutting depth equals the actual cutting depth of cutting tool 1050N associated with the image in which the color contrast between a first layer (e.g., insulation screen 3058) and a second layer (e.g., insulation 3056) was detected in the images.

In another example, computing device 1002 determines the target cutting depth for a particular layer based on one or more images associated with a single cut. For example, cable preparation device 1000 may extend cutting tool 1050N into the particular layer at a relatively deep depth (e.g., compared to one of the first cuts of a plurality of successively deeper cuts). Cameras 1072 may generate a first image of electrical cable 3050 in the x-direction (3002) and a second image of electrical cable 3050 in the y-direction (3003) after performing the cut. Computing device 1002 may determine the target cutting depth based on the first image, the second image, the size and angle of cutting tool 1050N, a width of the particular layer, a curvature of electrical cable 3050, or a combination thereof.

Figure 14:
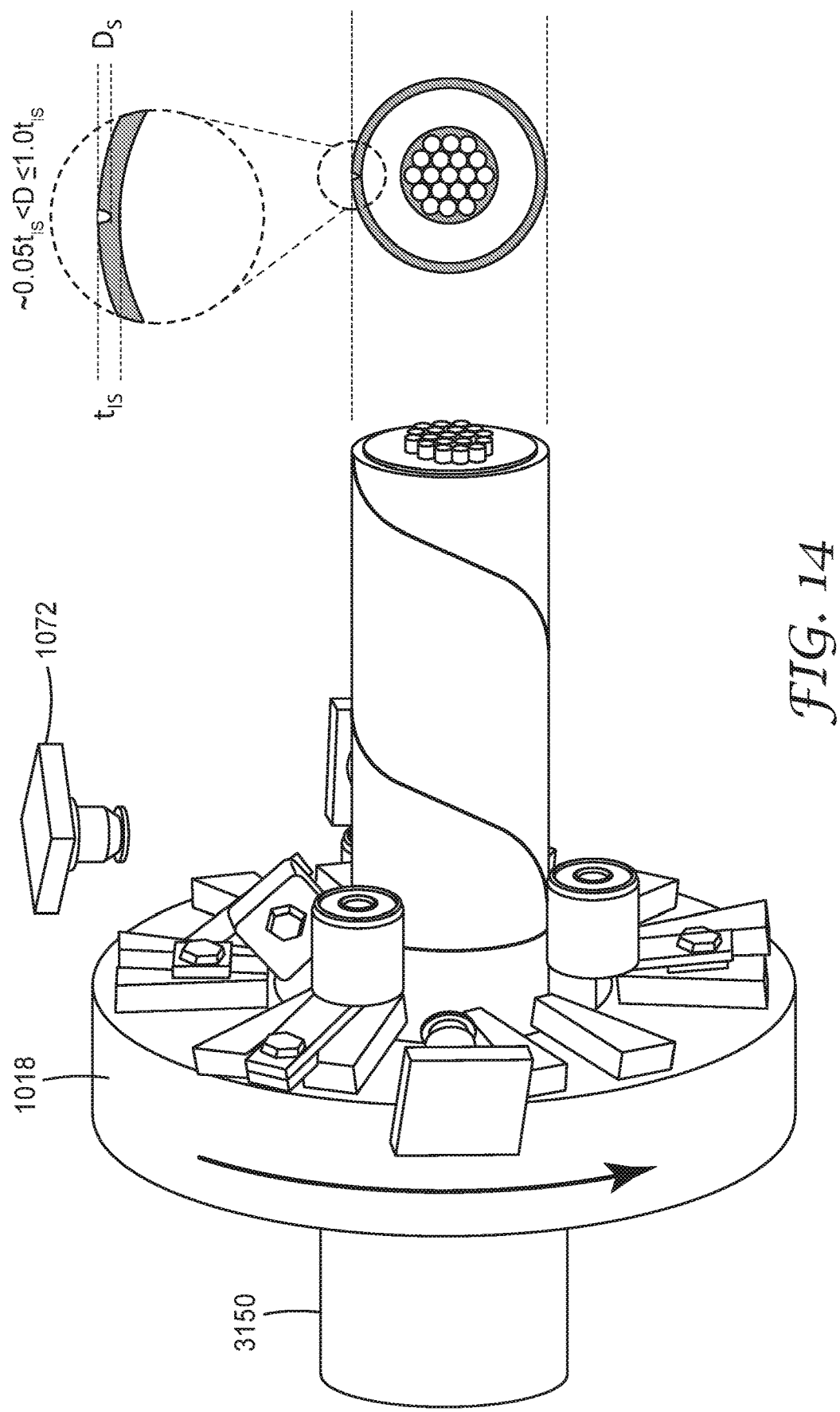
FIG. 14 is a conceptual diagram illustrating details of an example technique of preparing an example electrical cable using a cable preparation device having a camera, in accordance with various techniques of this disclosure.

FIG. 14 is a conceptual diagram illustrating details of an example technique of preparing an example electrical cable using a cable preparation device having a camera, in accordance with various techniques of this disclosure. FIG. 14 is described with reference to cable preparation device 1000 of FIG. 3, however, other cable preparation devices may be used to perform the described functionality.

Cable preparation device 1000 may include one or more cameras 1072 configured to generate images of the electrical cable 3150 during and/or after cutting electrical cable 3150. Cameras 1072 may generate one or more images of a cross-sectional of electrical cable 3150, of a longitudinal surface of electrical cable 3150, or both. In some examples, cameras 1072 are coupled to tool head 1018, such that cameras 1072 rotate about electrical cable 3150 as tool head 1018 rotates.

Cameras 1072 may generate images of electrical cable 3150 of one or more cuts performed by cutting tools 1050. For example, cameras 1072 may generate images of electrical cable 3150 before, during, and/or after cutting tools 1050 performs one or more cuts of electrical cable 3150 (e.g., a circumferential cut and/or a spiral cut).

Figure 15:
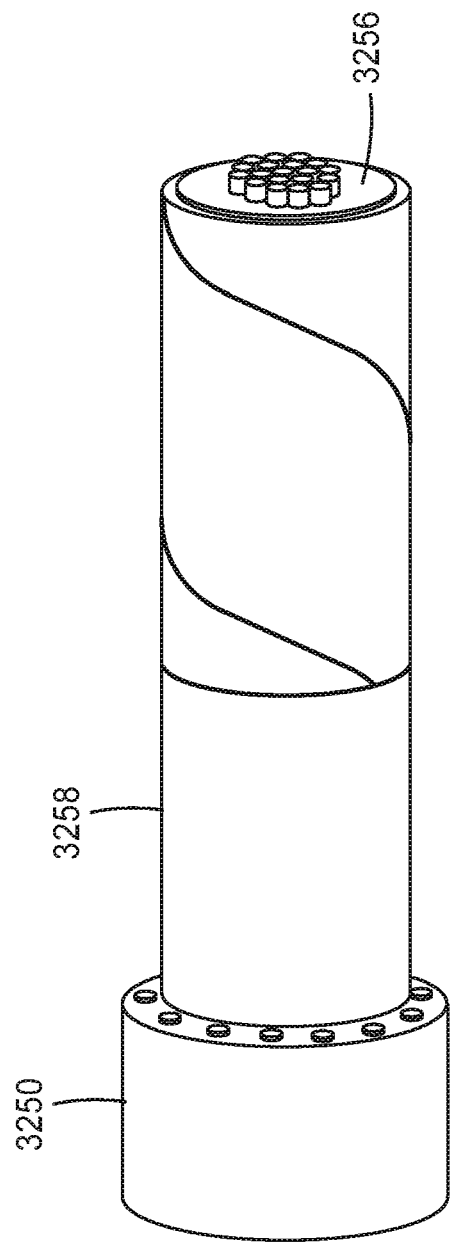
FIG. 15 is a conceptual diagram illustrating an example prepared electrical cable, in accordance with various techniques of this disclosure.

FIG. 15 is a conceptual diagram illustrating an example prepared electrical cable, in accordance with various techniques of this disclosure. Cable preparation device 1000 may perform a longitudinal cut through insulation screen 3258 to aid in removal of a portion of insulations screen 3258. Cable preparation device 1000 may perform the longitudinal cut at any position relative to the intersection of a spiral cut or score with the end of insulation 3256 or the end of insulation screen 3258. In one example, cable preparation device 1000 performs the longitudinal cut where the spiral cut intersects the end of the insulation 3256.

In some examples, cable preparation device 1000 performs the longitudinal cut in a damage tolerant zone. In such examples, cable preparation device 1000 may perform a relatively deep cut through the insulation screen (e.g., into the insulation), which may enable cable preparation device 1000 to better initiate the peeling process.

In some examples, cable preparation device 1000 removes an interior portion of insulation screen of cable in a manner similar to removing jacket layer. For example, cable preparation device 1000 may adjust a radial depth of tool mount 1020E and cutting tool 1050N coupled to tool mount 1020N. In one instance, cable preparation device 1000 adjusts the radial depth to a predetermined radial cutting depth (e.g., based on a type of electrical cable) or until the resistance or force against cutting tool 1050N or tool positioning driver 1026 satisfies (e.g., is greater than or equal to) a threshold resistance or force.

In some scenarios, cable preparation device 1000 compress spring 1068, which may cause cutting tool 1050N to cut at least partially through insulation screen to a first target cutting depth.

Tool head 1018 may rotate a partial rotation while cutting tool 1050N is at the first target cutting depth. In some examples, the first target cutting depth extends into an adjacent layer, such as insulation. Rotating tool head 1018 a partial rotation may enable cutting tool 1050N to create a tab.

In some examples, after creating a tab, cable preparation device 1000 may remove an interior portion of insulation screen in a manner similar to removing jacket layer. In some examples, cable preparation device performs a radial or longitudinal cut at the same cutting depth as used to create tab. In other words, in one example, cutting tool 1050N remains at the first target cutting depth when cutting through jacket layer to remove the interior portion of jacket layer.

In another example, cable preparation device 1000 adjusts the depth of cutting tool 1050N to a second target cutting depth that is shallower than the first target cutting depth. In other words, cable preparation device 1000 may retract cutting tool 1050N to the second target cutting depth. The second target cutting depth may be within a threshold depth of the first target cutting depth, which may enable cutting tool 1050N to remain under insulations screen. Retracting cutting tool 1050N to the second target cutting depth may lift tab from another layer adjacent to insulation screen (e.g., an insulation layer). In this way, cable preparation device may perform a spiral cut at the second target cutting depth to lift and remove the interior portion of insulation screen from electrical cable. In some examples, the second target cutting depth is also referred to as an insulation screen removal depth or a insulations screen removal position.

Tool head 1018 may remove the interior portion of jacket layer. In one example, tool head 1018 rotates with cutting tool 1050N at the second target cutting while moving longitudinally along slides 1014. For example, tool head 1018 may move longitudinally to a position defined by a target cutback length for insulation screen. In one example, upon arriving at the position defined by the target cutback length, one of cutting tools 1050 performs a circumferential cut to remove the interior portion of insulation screen. For example, tool head 1018 may perform a circumferential cut by rotating about electrical cable to terminate the cut to insulation screen 3458 and remove the interior portion of insulation screen.

In some examples, one of cutting tools 1050 (e.g., cutting tool 1050B) may perform a shaving operation on insulation screen and/or insulation of cable. Shaving insulation may enable cable preparation device 1000 to smooth the surface of insulation. Shaving insulation screen may enable cable preparation device 1000 to reduce or eliminate defects in the transition from insulation screen to insulation.

Figure 16:
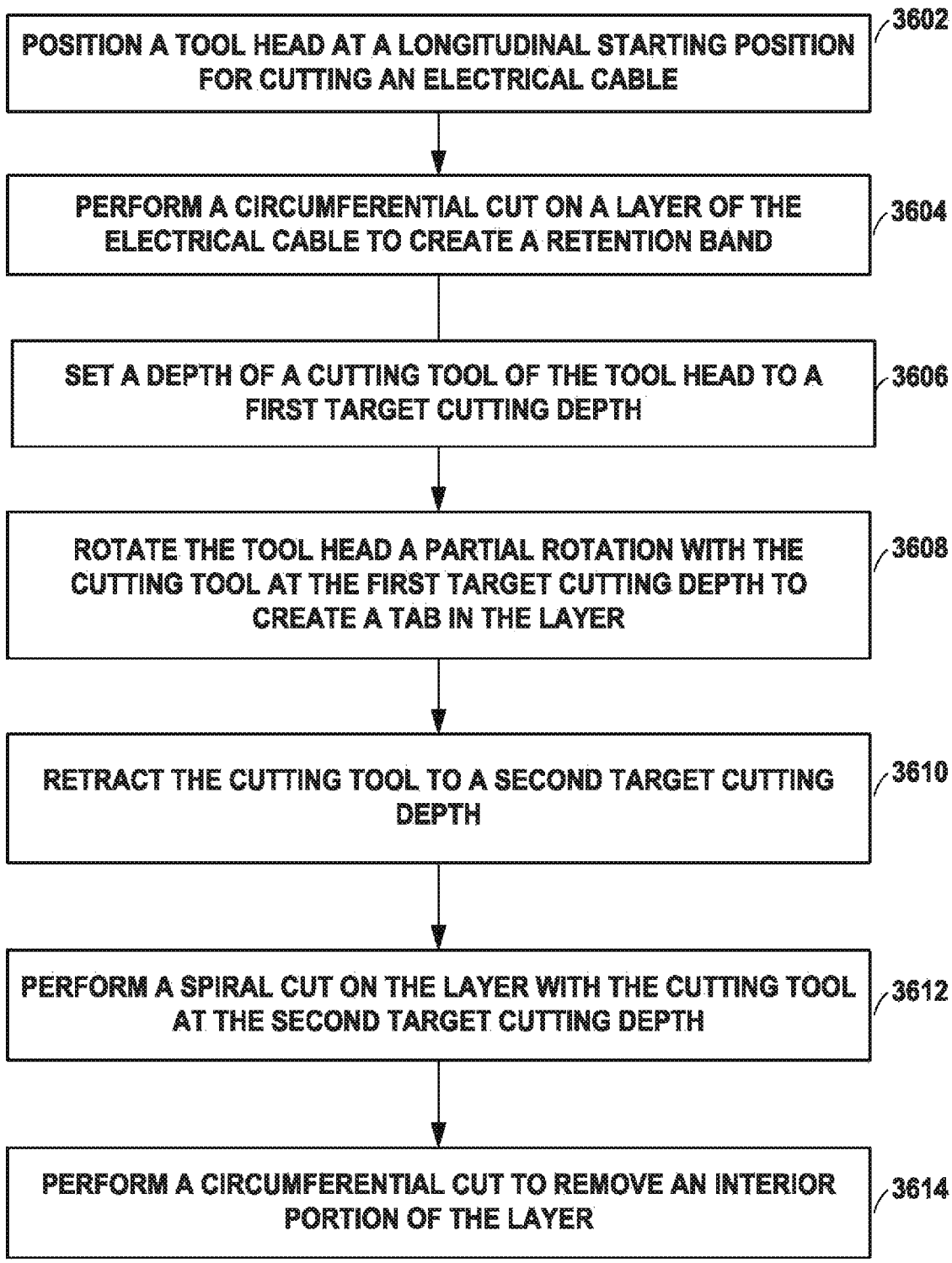
FIG. 16 is a flow chart illustrating example operations performed by an example cable preparation system, in accordance with various techniques of this disclosure.

FIG. 16 is a flow chart illustrating example operations performed by an example cable preparation device, in accordance with various techniques of this disclosure. FIG. 16 is described with reference to cable preparation device 1000 of FIG. 3, however, other cable preparation devices may be used to perform the described functionality. Electrical cable may be an example of electrical cable 350 of FIG. 2A or electrical cables 32 of FIGS. 1A and 1B, however, techniques of this disclosure may apply to other electrical cables as well.

Cable preparation device 1000 may create a retention band by cutting through one or more layers of electrical cable 32A. For example, cable preparation device 1000 positions tool head 1018 at a longitudinal starting position a distance from an end of the electrical cable 32 (3602). Cable preparation device 1000 performs a circumferential cut through at least one layer of electrical cable 32A to create a retention band using the jacket layer of electrical cable 32A (3604). For example, cable preparation device 1000 may perform the circumferential cut by rotating the tool head around electrical cable 32A while tool head 1018 remains stationary in the longitudinal direction.

Responsive to creating the retention band, cable preparation device 1000 may remove an inner portion of the jacket layer between the longitudinal starting position and a longitudinal position defined by a target cutback length associated with the jacket layer. In one example, cable preparation device 1000 sets a depth of one of cutting tools 1050 (e.g., the same cutting tool used to perform the circumferential cut or a different cutting tool) to a first target cutting depth (3606).

Cable preparation device 1000 creates a tab in the jacket layer by rotating tool head 1018 a partial rotation with the cutting tool at the first target cutting depth (3608). Responsive to creating the tab in the jacket layer, in some examples, cable preparation device 1000 retracts the cutting tool to a second target cutting depth (3610). The second target cutting depth may be shallower than the first target cutting depth, which may lift the tab portion of the jacket layer from an adjacent layer (e.g., a shield layer).

In one example, cable preparation device 1000 performs a spiral cut on the jacket layer with the cutting tool at the second target cutting depth (3612). For example, cable preparation device 1000 may perform a spiral cut along an interior portion of electrical cable 32A by rotating tool head 1018 while moving tool head 1018 longitudinally along slides 1014.

In some examples, cable preparation device 1000 performs a circumferential cut to remove the interior portion of electrical cable 32A (3614). Cable preparation device 1000 may perform the circumferential cut using the same cutting tool used to perform the spiral cut or another one of cutting tools 1050.

FIGS. 17A and 17B are conceptual diagrams illustrating an example tab 1702 in an electrical cable 1700 using a cable preparation device, in accordance with various techniques of this disclosure. FIGS. 17A and 17B are described with reference to cable preparation device 1000 of FIG. 3, however, other cable preparation devices may be used to perform the described functionality.

Cable preparation device 1000 may create a tab 1702 in a layer (e.g., an insulation screen 1704). In one example, cable preparation device utilizes a single cutting tool to create the tab. For example, cable preparation device 1000 performs a longitudinal cut at the end of the insulation screen and performs a spiral cut after performing the longitudinal cut. Performing a longitudinal cut followed by the spiral cut may create a tab at the end of the insulation screen layer. Cable preparation device 1000 may perform a circumferential cut after performing the spiral cut. Performing the longitudinal cut at the end of the layer followed by a spiral cut may create a tab, which may facilitate peeling (e.g., automatically or manually) of the insulation screen. Cable preparation device 1000 may utilize a single cutting tool to perform the longitudinal, spiral, and circumferential cut. By performing a series of cuts in this manner, cable preparation device 1000 may cut or score the insulation screen with a single cutting tool 1050, compared to some techniques which may utilize two different cutting tools to perform different cuts.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "proximate," "distal," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above or on top of those other elements.

As used herein, when an element, component, or layer for example is described as forming a "coincident interface" with, or being "on," "connected to," "coupled with," "stacked on" or "in contact with" another element, component, or layer, it can be directly on, directly connected to, directly coupled with, directly stacked on, in direct contact with, or intervening elements, components or layers may be on, connected, coupled or in contact with the particular element, component, or layer, for example. When an element, component, or layer for example is referred to as being "directly on," "directly connected to," "directly coupled with," or "directly in contact with" another element, there are no intervening elements, components or layers for example. The techniques of this disclosure may be implemented in a wide variety of computer devices, such as servers, laptop computers, desktop computers, notebook computers, tablet computers, hand-held computers, smart phones, and the like. Any components, modules or units have been described to emphasize functional aspects and do not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. Additionally, although a number of distinct modules have been described throughout this description, many of which perform unique functions, all the functions of all of the modules may be combined into a single module, or even split into further additional modules. The modules described herein are only exemplary and have been described as such for better ease of understanding.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device.

The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

What is claimed is:

1. An electrical cable preparation device configured to remove one or more layers of an electrical cable, the device comprising:
    a rotatable tool head comprising:
        a plurality of tool mounts configured to move radially relative to a center axis of the electrical cable;
        a plurality of rollers; and
        at least one cutting tool;
        wherein the plurality of rollers and the at least one cutting tool are configured to be coupled to the plurality of tool mounts;
        wherein the at least one cutting tool includes at least one spring loaded cutting tool; and
        wherein the at least one cutting tool includes a first cutting tool configured to remove a jacket layer of the electrical cable and a second cutting tool configured to remove an insulation layer of the electrical cable;
    a linear guide, wherein the electrical cable preparation device is configured to cause the rotatable tool head to move longitudinally along the linear guide in response to a command from a computing device; and
    a driver configured adjust a radial depth of the plurality of rollers and/or a radial depth of the at least one cutting tool.

2. The device of claim 1, wherein the plurality of rollers are configured to move symmetrically in a radial direction relative to a center axis of the electrical cable.

3. The device of claim 1, wherein a cutting angle of the first cutting tool is steeper than a cutting angle of the second cutting tool.

4. The device of claim 1, wherein a center axis of at least one cutting tool is positioned approximately 180 degrees around the tool head relative to a center axis of at least one roller of the plurality of rollers.

5. The device of claim 1, wherein the cable preparation device is configured to remove the one or more layers of the electrical cable by at least being configured to:
    insert the at least one cutting tool into the electrical cable to a first depth;
    rotate the tool head a partial rotation with the at least one cutting tool at the first depth to create a tab in the one or more layers at an end of the one or more layers;
    retract the at least one cutting tool to a second depth; and
    perform a spiral cut with the at least one cutting tool at the second depth.

6. The device of claim 5, wherein the cable preparation device is configured to remove the one or more layers of the electrical cable by at least being further configured to, after performing the spiral cut, perform a circumferential cut with the at least one cutting tool at the second depth.

7. The device of claim 1, wherein the cable preparation device is configured to:
    create a retention band of a jacket layer of the one or more layers of the electrical cable by at least being configured to:
        position the tool head at a longitudinal starting position a distance from an end of the electrical cable;
        insert the at least one cutting tool toward a center of the electrical cable to a target cutting depth; and
        rotate the tool head around the electrical cable with the at least one cutting tool at the target cutting depth; and
    responsive to creating the retention band, remove an inner portion of the jacket layer between the longitudinal starting position and a longitudinal position defined by a target cutback length associated with the jacket layer.

8. The electrical cable preparation device of claim 1, wherein the electrical cable preparation device configured to perform a spiral cut on the electrical cable by moving the rotatable tool head longitudinally and simultaneously moving the rotatable tool head around the electrical cable.

9. The electrical cable preparation device of claim 1, wherein the driver is configured to adjust the radial depth of the plurality of rollers and/or a radial depth of the at least one cutting tool in response to another command from the computing device.

10. The electrical cable preparation device of claim 1, wherein the electrical cable preparation device includes an opening configured to receive a portion of the electrical cable.

11. An electrical cable preparation device configured to remove one or more layers of an electrical cable, the device comprising:

a rotatable tool head comprising:
    a plurality of tool mounts configured to move radially relative to a center axis of the electrical cable;
    a plurality of rollers; and
    at least one cutting tool;
    wherein the plurality of rollers and the at least one cutting tool are configured to be coupled to the plurality of tool mounts;
    wherein the at least one cutting tool includes at least one spring loaded cutting tool; and
    wherein the at least one cutting tool includes a first cutting tool configured to remove a jacket layer of the electrical cable and a second cutting tool configured to remove an insulation layer of the electrical cable; and
a linear guide, wherein the electrical cable preparation device is configured to, in response to one or more commands from a computing device, cause the rotatable tool head to move longitudinally along the linear guide and to cause the rotatable head to rotate,
wherein the cable preparation device is configured to remove the one or more layers of the electrical cable by at least being configured to:
    insert the at least one cutting tool into the electrical cable to a first depth;
    rotate the tool head a partial rotation with the at least one cutting tool at the first depth to create a tab in the one or more layers at an end of the one or more layers;
    retract the at least one cutting tool to a second depth; and
    perform, with the at least one cutting tool at the second depth, a spiral cut by rotating the tool head around the electrical cable as the tool head moves from the tab longitudinally relative to a center axis of the electrical cable.

12. The electrical cable preparation device of claim 11, wherein the cable preparation device is further configured to:
    create a retention band of a jacket layer of the one or more layers of the electrical cable by at least being configured to:
        position the tool head at a longitudinal starting position a distance from an end of the electrical cable;
        insert the at least one cutting tool toward a center of the electrical cable to a target cutting depth; and
        rotate the tool head around the electrical cable with the at least one cutting tool at the target cutting depth; and
    responsive to creating the retention band, remove an inner portion of the jacket layer between the longitudinal starting position and a longitudinal position defined by a target cutback length associated with the jacket layer.

13. The electrical cable preparation device of claim 11, wherein the plurality of rollers are configured to move symmetrically in a radial direction relative to a center axis of the electrical cable.

14. The electrical cable preparation device of claim 11, wherein the electrical cable preparation device configured to perform a spiral cut on the electrical cable by moving the rotatable tool head longitudinally and simultaneously moving the rotatable tool head around the electrical cable.

15. The electrical cable preparation device of claim 11, wherein the electrical cable preparation device includes an opening configured to receive a portion of the electrical cable.

16. A method performed by an electrical cable preparation device that is configured to remove one or more layers of an electrical cable, the device comprising:
    a rotatable tool head comprising:
        a plurality of tool mounts configured to move radially relative to a center axis of the electrical cable;
        a plurality of rollers; and
        at least one cutting tool;
        wherein the plurality of rollers and the at least one cutting tool are configured to be coupled to the plurality of tool mounts;
        wherein the at least one cutting tool includes at least one spring loaded cutting tool; and
        wherein the at least one cutting tool includes a first cutting tool configured to remove a jacket layer of the electrical cable and a second cutting tool configured to remove an insulation layer of the electrical cable;
    a linear guide, wherein the electrical cable preparation device is configured to cause the rotatable tool head to move longitudinally along the linear guide in response to a command from a computing device; and
    a driver configured adjust a radial depth of the plurality of rollers and/or a radial depth of the at least one cutting tool,
the method comprising:
    creating, by the electrical cable preparation device, a retention band of the jacket layer of the electrical cable by at least:
        positioning, by the electrical preparation device, a tool head of the electrical cable preparation device at a longitudinal starting position a distance from an end of the electrical cable;
        adjusting, by the electrical preparation device, the radial depth of at least one cutting tool of the tool head to a target cutting depth; and
        rotating, by the electrical preparation device, the tool head with the at least one cutting tool at the target cutting depth; and
    responsive to creating the retention band, removing, by the electrical preparation device, an inner portion of the jacket layer between the longitudinal starting position and a longitudinal position defined by a target cutback length associated with the jacket layer.

17. The method of claim 16, wherein the target cutting depth is a first target cutting depth, and wherein removing the inner portion of the jacket layer comprises:
    inserting, by the cable preparation device, the at least one cutting tool into the electrical cable to the first target cutting depth;
    rotating, by the electrical cable preparation device, the tool head a partial rotation with the at least one cutting tool at the first target cutting depth to create a tab;
    retracting, by the electrical cable preparation device, the at least one cutting tool to a second target cutting depth;
    performing, by the electrical preparation device, a spiral cut with the at least one cutting tool at the second target cutting depth; and
    performing, by the electrical cable preparation device, a circumferential cut with the at least one cutting tool at the second target cutting depth.

18. The method of claim 16, wherein adjusting a radial depth of the at least one cutting tool comprises:
    inserting, by the cable preparation device, a driver into the tool head to engage a tool mount of the tool head, the at least one cutting tool mounted to the tool mount; and rotating, by the cable preparation device, the driver to adjust the radial depth of the at least one cutting tool.

19. A method performed by an electrical cable preparation device that is configured to remove one or more layers of an electrical cable, the device comprising:
   a rotatable tool head comprising:
      a plurality of tool mounts configured to move radially relative to a center axis of the electrical cable;
      a plurality of rollers; and
      at least one cutting tool;
      wherein the plurality of rollers and the at least one cutting tool are configured to be coupled to the plurality of tool mounts;
      wherein the at least one cutting tool includes at least one spring loaded cutting tool; and
      wherein the at least one cutting tool includes a first cutting tool configured to remove a jacket layer of the electrical cable and a second cutting tool configured to remove an insulation layer of the electrical cable;
   a linear guide, wherein the electrical cable preparation device is configured to cause the rotatable tool head to move longitudinally along the linear guide in response to a command from a computing device; and
   a driver configured adjust a radial depth of the plurality of rollers and/or a radial depth of the at least one cutting tool, the method comprising:
   inserting, by the cable preparation device, the at least one cutting tool of the rotatable tool head of the electrical cable preparation device into at least one layer of the electrical cable to a first depth;
   rotating, by the electrical cable preparation device, the tool head a partial rotation with the at least one cutting tool at the first depth to create a tab;
   retracting, by the electrical cable preparation device, the at least one cutting tool to a second depth; and
   performing, by the electrical preparation device, a spiral cut with the at least one cutting tool at the second depth.

20. The method of claim 19, wherein performing the spiral cut comprises:
   while rotating the tool head about the electrical cable with the at least one cutting tool at the second depth, moving, by the electrical preparation device, the tool head longitudinally along one or more linear slides.

21. The method of claim 19, wherein inserting the at least one cutting tool to the first depth comprises:
   inserting, by the cable preparation device, a driver into the tool head to engage a tool mount of the tool head, the at least one cutting tool mounted to the tool mount; and
   rotating, by the cable preparation device, the driver to adjust a radial depth of the at least one cutting tool to the first depth.

22. The method of claim 19, wherein the electrical cable preparation device includes an opening configured to receive a portion of the electrical cable.

* * * * *